United States Patent
Csipkes

[19]

[11] Patent Number: 5,898,494
[45] Date of Patent: Apr. 27, 1999

[54] AUTOMATIC INSPECTION SYSTEM AND METHOD FOR CONTACTLESSLY MEASURING THE DISPARITY BETWEEN TWO SURFACES

[75] Inventor: Andrei Csipkes, Lawrenceville, Ga.

[73] Assignee: Lucent Technologies Inc., Murray Hill, N.J.

[21] Appl. No.: 08/429,999

[22] Filed: Apr. 27, 1995

[51] Int. Cl.[6] .................................................. G01B 9/02
[52] U.S. Cl. ........................................ 356/345; 356/360
[58] Field of Search ................................. 356/345, 359, 356/360

[56] References Cited

U.S. PATENT DOCUMENTS 4,738,507  4/1988  Palmquist .
4,738,508  4/1988  Palmquist .
4,787,698  11/1988 Lyons et al. .

OTHER PUBLICATIONS

"Checkmate F5 System Instruction Manual," Oyokoden Lab Co., Ltd. (at least as early as 1991).
"Norland Fiber Interferometer," Norland Products Inc., New Brunswick, NJ (1992).
"ZX–1 Zoom Interferometers," Direct Optical Research Company, Phoenix, AZ (at least as early as Jan. 1995).
"Topo–3D Quick Tour Manual," Wyko Corporation, Tucson, AZ., Ltd. (Feb. 1990).

*Primary Examiner*—Robert Kim

[57] ABSTRACT

An inspection system (90) has a measurement apparatus (91) with an interferometer (98) controlled by a machine vision system (92) for determining the degree of disparity or discontinuity of one surface relative to another surface, particularly the amount of undercut or protrusion of an optical fiber (26) relative to an adjacent surrounding termination plug (36) in an optical fiber termination (37). The machine vision system (92) employs an inspection control algorithm (120) that is reliable, accurate, and user friendly. Moreover, the machine vision system (92) can receive prompts from a user via an input device (94), such as a keyboard, and can transfer information to the user via an output device (93), such as a display, and/or to another system.

19 Claims, 20 Drawing Sheets

FIG. 8

START
ROUGH AUTOFOCUS ALGORITHM FOR DETECTION OF FIBER POSITION — 123

↓

DEFOCUS PIEZO ELEMENT — 161

↓

MOVE IN n SIZE STEP AND SNAP PICTURE — 162

↓

COLLECT ALL INTENSITY LEVELS OF PIXELS LOCATED ON A ROUGH FOCUS GRID AND CALCULATE THE SUM OF THEIR GRADIENTS — 163

↓

164 — BASED ON THE GRADIENT SUMS, ARE FRINGES OVER THE CENTER OF THE SCREEN? — NO (loop back to 162)

↓ YES

SLIGHTLY DEFOCUS IMAGE BY ESTIMATED AMOUNT TO SHIFT FRINGES UNDER SELECTED AREA USED FOR FIBER CORE LOCATION CALCULATIONS — 165

↓

PERFORM GRAY LEVEL SEARCH OF FIBER BOUNDARY, FIT A CIRCLE TO COLLECTED POINTS AND USE HOUGH TRANSFORM TO DETERMINE LOCATION OF FIBER CORE (CIRCLE FIT WITH MODAL RADIUS ERROR CORRECTION FOLLOWED BY SECOND CIRCLE FIT ON REMAINING POINTS) — 166

↓

PLACE FOCUS PARAMETERS AND NEWLY DETERMINED LOCATION OF CORE INTO MEMORY BUFFER FOR PASS TO PRECISION FOCUS MODULE — 167

START
PRECISION AUTOFOCUS ALGORITHM FOR CENTERING INTERFEROMETRIC BANDS OVER FIBER CORE

↓

GET FIBER CENTER COORDINATES AND PIEZO'S LAST EXCITATION STATE AND CENTER PRECISION FOCUS GRID OVER FIBER CORE — 171

↓

MOVE $n_1$ STEPS AND SNAP PICTURE — 172

↓

COLLECT ALL INTENSITY LEVELS OF PIXELS LOCATED ON PRECISION FOCUS GRID AND CALCULATE THE SUM OF THEIR GRADIENTS — 173

↓

174 — BASED ON THE GRADIENT SUMS, DO FRINGES BEGIN TO OVERLAP THE CORE OF THE FIBER?  — NO → (back to 172)

↓ YES

175 — MOVE IN $n_2 < n_1$ SIZE STEP AND SNAP PICTURE (ZOOM IN)

↓

176 — COLLECT ALL INTENSITY LEVELS OF PIXELS LOCATED ON PRECISION FOCUS GRID AND CALCULATE THE SUM OF THEIR GRADIENTS

↓

(A)    (B)

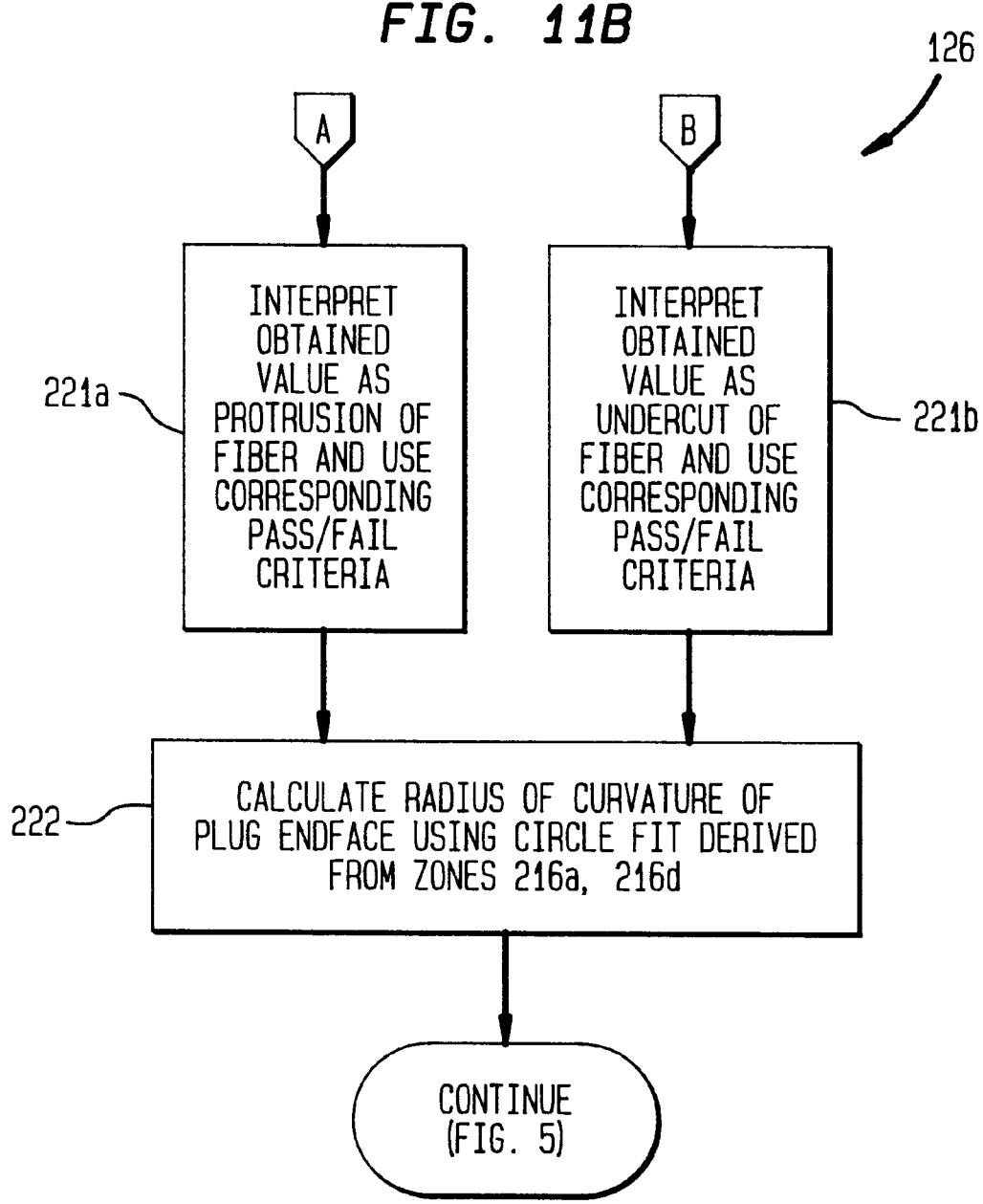

AUTOMATIC INSPECTION SYSTEM AND METHOD FOR CONTACTLESSLY MEASURING THE DISPARITY BETWEEN TWO SURFACES

FIELD OF THE INVENTION

The present invention generally relates to measurement, testing, and quality control systems, and more particularly, to an automatic inspection system and method for contactlessly measuring the degree of disparity or discontinuity between two surfaces. The system and method are particularly suited for, but not limited to, contactlessly measuring the extent of undercut or protrusion of an optical fiber relative to a surrounding support material at the endface of an optical fiber termination.

BACKGROUND OF THE INVENTION

An optical fiber used for communications includes a core and cladding concentrically surrounding the core. Considering that the optical fiber may have an outer diameter of about 125 microns ($10^{-6}$ m; $\mu$m) and that a typical core measures about 2 to 50 $\mu$m in diameter, the connection of two optical fibers so that their cores are aligned is a formidable task. In order to establish such a precise connection between optical fibers, several different connection configurations have been developed.

One known configuration is referred to as a biconic connection. An example of a biconic connection is shown and described in U.S. Pat. No. 4,787,698 to Lyons et al. This connection includes facilities for holding two plugs, each of which terminates an optical fiber and each of which has a conically-shaped endface. The optical fiber terminates in a pedestal which extends beyond an endface of the plug. Two plugs are received in opposite ends of a sleeve which is mounted in a housing. The sleeve includes opposed, conically shaped cavities for receiving the plugs and for holding them in a manner to cause the endfaces of the optical fibers to engage each other and to precisely align the optical fibers.

Another known configuration for establishing a connection between optical fibers is referred to as a ferrule connection. An example of a ferrule connection is shown and described in both U.S. Pat. No. 5,738,508 to Palmquist and U.S. Pat. No. 4,738,507 to Palmquist. The ferrule connection includes a coupler having a plug-receiving tubular portion at each end thereof. Each tubular portion is provided with a longitudinally extending slot. A sleeve which floats within the coupler is adapted to coaxially receive two plugs, each of which is adapted to terminate an optical fiber. Each plug has a passageway extending longitudinally therethrough for receiving an optical fiber and is mounted in a connector body having an alignment pin projecting radially therefrom. When the connector body is received in a tubular portion of the coupler, the alignment pin is received in the slot which extends along the tubular portion.

In both of the aforementioned connections, the endfaces of separate optical fiber terminations are joined by a coupling structure. Furthermore, to enable optimal performance, the coupling structure should join the termination endfaces so that the core and cladding are substantially contiguous and aligned. In order to join the optical fiber terminations in this manner with these coupling structures, the termination endfaces, which typically includes the fiber (core and cladding) and a surrounding termination support material, should be substantially continuously domed, or exhibit a spherical curvature. To achieve this configuration, the termination endface is typically machined by grinding and/or polishing.

If the fiber is recessed within the surrounding termination support material, then the termination endface is said to be "undercut." In this situation, after the termination endfaces have been joined by the coupling structure, reflections will arise during operation because signals must pass through an air gap when the signals travel through the coupling structure. In contrast, when the fiber "protrudes" out from the surrounding termination support material, then the fiber is susceptible to fracturing or suffering damage when joined by the coupling structure.

The amount of termination undercut or protrusion (hereafter, undercut/protrusion) can be determined manually by a visual inspection of the termination endface through a microscope equipped with interferometric optics. However, with this technique, there is no way for quantifying the undercut/protrusion with precision and repeatability. Furthermore, visual inspection requires an unacceptably long time period to reach a conclusion.

Another known technique for determining the degree of undercut/protrusion involves constructing a three-dimensional (3D) surface image model of the termination endface. After the 3D surface image model has been constructed, then the extent of undercut/protrusion is determined by visually examining the image on a display and by making estimations and calculations. An example of a commercially available apparatus for performing the foregoing methodology is called a WYKO Topological Measurement System, which is manufactured by WYKO, Inc., U.S.A. However, this technique requires sampling and measurement of numerous image planes for construction of the 3D surface image, resulting in a computationally intensive operation that is again time consuming. In fact, the 3D image model typically takes several minutes to generate.

SUMMARY OF THE INVENTION

Briefly described, the present invention is an automatic inspection system and method for contactlessly measuring the degree of disparity or discontinuity between two surfaces with extreme accuracy, reliability, low cost requirements, minimal time requirements, and full automation. The inspection system and method are particularly suited for, but not limited to, measuring the degree of undercut or protrusion of an optical fiber relative to a surrounding support material at the endface of an optical fiber termination.

The inspection method generally comprises the steps of: producing an image of first and second surfaces with an interferometric fringe superimposed over first and second image regions representing the first and second surfaces, respectively, and then, determining the disparity between the first and second surfaces based upon an offset of the interferometric fringe between the first and second image regions.

In order to practice the aforementioned method, an automatic inspection system is provided. The automatic inspection system comprises an interferometer disposed at an angle $\phi$ (preferably about 3°) relative to a target where the surfaces are measured. Because of the angle $\phi$, when the surfaces are exposed to the interferometer, an interferometric fringe is superimposed over an image captured by the interferometer. A camera is coupled to the interferometer for capturing and encoding the image. A machine vision system connected to the camera receives the image, measures an offset between the fringe in a first region over the first surface and the fringe in a second region over the second surface, and determines the disparity between the surfaces based upon the offset. Finally, an output device, such as a display, which is controlled by the machine vision system, conveys the disparity information regarding the image to the user.

The inspection system and method of the present invention has numerous advantages, a few of which are delineated hereafter as examples.

An advantage of the inspection system and method is that they can determine the disparity or discontinuity between two surfaces. Particularly, the inspection system and method may be employed to determine the extent of undercut/protrusion of an optical fiber relative to a surrounding plug in an optical fiber termination, for example but not limited to, in a biconic termination or a ferrule termination.

Another advantage of the inspection system and method is that they are fully automatic and can provide a specific numerical value corresponding with the disparity or undercut/protrusion preferably over a display, to a user of the system and/or to another system, for example, a product handling system or product tracking system. The user need not make any visual estimations from a display and need not make any manual calculations.

Another advantage of the inspection system and method is that they can measure the undercut/protrusion of an optical fiber with respect to a surrounding termination plug with extreme accuracy. In the preferred embodiment, the undercut/protrusion can be measured between about +500 nanometers (nm) and about −500 nm. For samples with under 150 nm undercut/protrusion, the precision is about ±10 nm, and for samples with above about 150 nm undercut/protrusion, the precision is about ±20 nm.

Another advantage of the inspection system and method is that they are consistently reliable and are characterized by repeatability that is superior to human judgment, interpretation, and estimation.

Another advantage of the inspection system and method is that they can fully perform an undercut/protrusion measurement in a very short time period as compared to prior art systems and techniques. In the preferred embodiment, the measurement can be fully performed in less than about five seconds, as compared to minutes with prior art techniques.

Another advantage of the inspection system and method is that they are robust relative to noise as a result of the implementation of numerous noise filtering algorithms. Noise may be the result of dirt, dust, a bonding agent (e.g., epoxy) or other foreign material disposed on the termination plug and/or fiber.

Another advantage of the inspection system and method is that they can be utilized as an inspection tool in a commercial fiber optic manufacturing facility to ensure quality control of fiber optic terminations.

Another advantage of the inspection system and method is that they can be implemented at a fraction of the cost of other prior art systems and methods that are used to determine the disparity between two surfaces.

Another advantage of the inspection system and method is that they are noncontact and nondestructive.

Another advantage of the inspection system and method is that they are flexible, user configurable, and user friendly. In fact, with the inspection system, the user may select one of several diagnostic modes of operation, each of which provides a different species of information to the user.

Another advantage of the inspection system and method is that undercut/protrusion of an optical fiber termination can be measured without having to launch light through the fiber and outwardly toward the system. The light utilized to make measurements in the preferred embodiment is white light that is supplied by an interferometer.

Another advantage of the inspection system and method is that the angle $\phi$ of the interferometer relative to the longitudinal axis of the termination plug can be changed and accurate calibration and results are still achieved.

Another advantage of the inspection system and method is that the radius of curvature of the domed endface of the termination plug as well as fiber may vary and accurate calibration and results are still achieved.

Another advantage of the inspection system and method is that they employ a novel two-phase autofocus algorithm for positioning the fiber endface in the center of the display image and the fringe pattern over the core endface of the fiber. The two-phase autofocus algorithm is characterized by minimal calculations, high speed, and extreme accuracy.

Another advantage of the inspection system and method is that they employ a novel self-calibration algorithm to account for variations in the angle of the interferometer relative to the longitudinal axis of the termination plug and variations in the fiber/plug radius of curvature.

Another advantage of the inspection system and method is that they employ a novel zone generation algorithm that utilizes multiple display fields. Use of fields optimizes speed by eliminating the need to process the entire image. Further, the use of fields minimizes the adverse effects of noise.

Another advantage of the inspection system and method is that they employ a novel band tracing algorithm that ensures extreme accuracy when tracing an interferometric fringe generated by the interferometer.

Another advantage of the inspection system and method is that they employ a novel transition zone algorithm that helps to eliminate noise at the demarkation region between the fiber and surrounding termination plug of a termination.

Another advantage of the inspection system and method is that they employ a novel band matching algorithm and a novel transition zone algorithm that fill in discontinuities in the fringe used to compute the disparity d (undercut\protrusion), so that subsequent curve fitting and the disparity computation are optimized.

Other features and advantages will become apparent to one with skill in the art upon examination of the following drawings and detailed description. All such additional features and advantages are intended to be included herein within the scope of the present invention, as is defined by the claims.

BRIEF DESCRIPTION OF THE DRAWINGS

The present invention can be better understood with reference to the following drawings. The drawings are not necessarily to scale, emphasis instead being placed upon clearly illustrating principles of the present invention. Furthermore, in the drawings, like reference numerals designate corresponding parts throughout the several views.

FIG. 1A shows a perspective view of the ferrule connection; FIG. 1B shows a cross sectional view of an optical fiber; FIG. 1C shows a cross sectional view of an optical fiber cable taken along line C'–C' of FIG. A; FIG. 1D shows a cross sectional view of a termination endface taken along line 1D'–1D' of FIG. 1A; FIG. 1E shows a cross sectional view of the ferrule connection taken along line 1EF'–1EF' of FIG. 1A; and FIG. 1F shows a partial exploded view of the ferrule connection taken along line 1EF'–1EF';

FIG. 4A shows an image that indicates that the fiber and termination plug have conforming endfaces; FIG. 4B shows an image that indicates that the fiber is undercut relative to the termination plug; and FIG. 4C is an image that indicates that the fiber is protruding outwardly from the termination plug;

FIG. 8 is a flow chart illustrating the architecture and functionality of a rough autofocus algorithm associated with the inspection control algorithm of FIG. 5;

FIGS. 9A through 9C show a flow chart illustrating the architecture and functionality of a precision autofocus algorithm associated with the inspection control algorithm of FIG. 5;

FIGS. 11A through 11B show a flow chart illustrating a data analysis algorithm associated with the inspection control algorithm of FIG. 5;

DETAILED DESCRIPTION OF THE PREFERRED EMBODIMENT

Although not limited to this particular application, the inspection system and method of the present invention are particularly suited for determining the amount of undercut/protrusion of an optical fiber relative to an adjacent surrounding termination plug associated with an optical fiber termination, for example, a biconic termination or a ferrule termination. For the sake of clarity, a ferrule connection with associated ferrule terminations is shown in the figures and is described hereafter. Note that the ferrule connection described hereafter is disclosed in more detail in U.S. Pat. No. 4,738,508 to Palmquist and U.S. Pat. No. 4,738,507 to Palmquist.

I. FERRULE CONNECTION

Figure 1A:
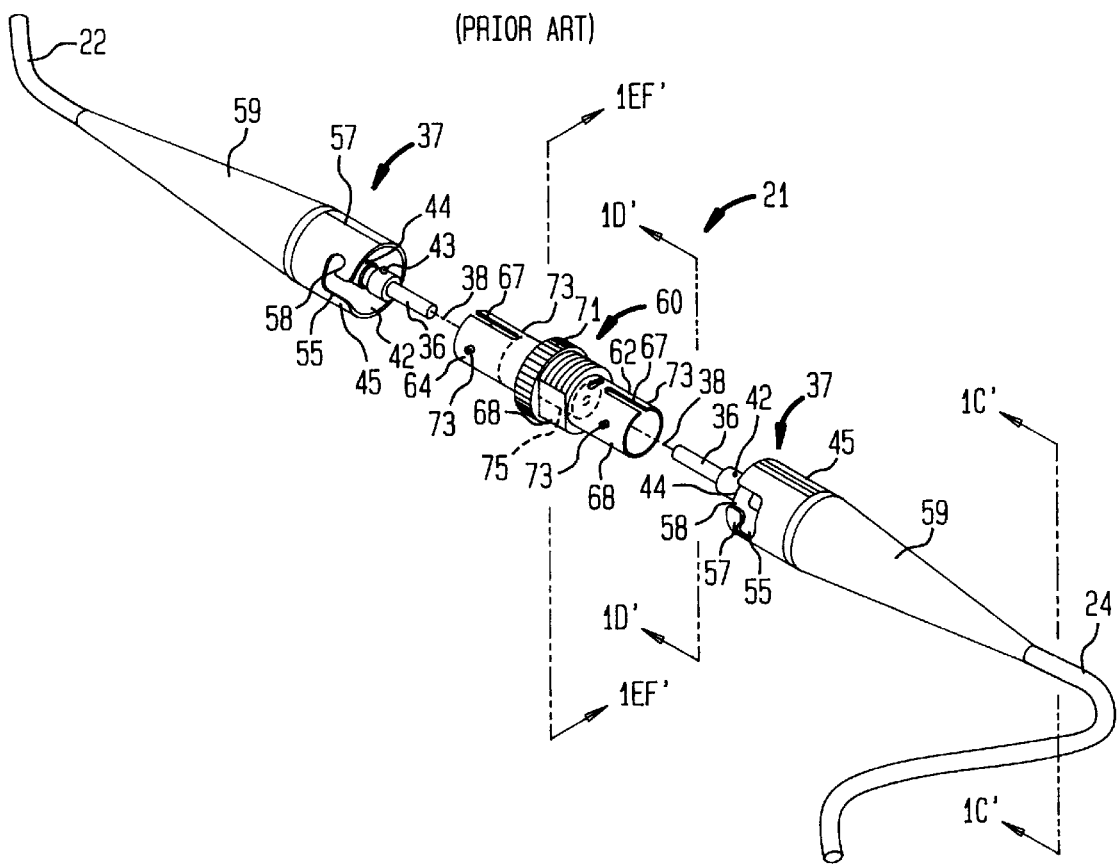
FIGS. 1A through 1F illustrate a conventional ferrule connection wherein terminations are joined by a ferrule coupling; specifically.
Figure 1B:
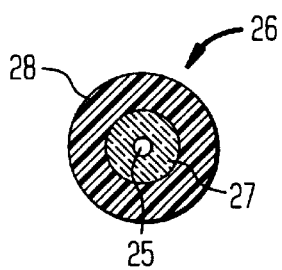
Figure 1C:
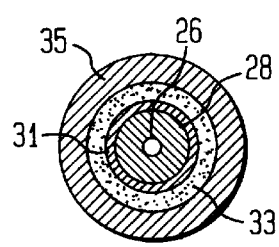
Figure 1D:
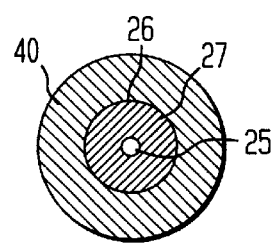

Referring now to FIGS. 1A through 1F, there is shown an optical fiber connection 21 for providing an interface between an optical fiber cable 22 and an optical fiber cable 24. As shown in FIGS. 1B and 1C, each of the optical fiber cables 22, 24 includes a single optical fiber 26 having a core 25 and a surrounding cladding 27 enclosed in a coating 28 and having a tube 31 of usually polyvinyl chloride (PVC) extruded thereabout. Covering the tube 31 is a strength member 33, which is often made of Kevlar® fibrous material, for example, and an outer jacket 35, which may be constructed from PVC.

Figure 1E:
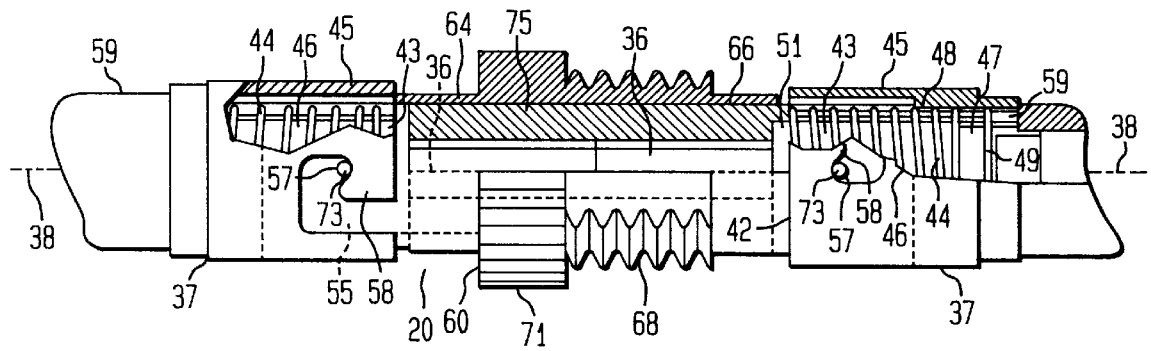
Figure 1F:
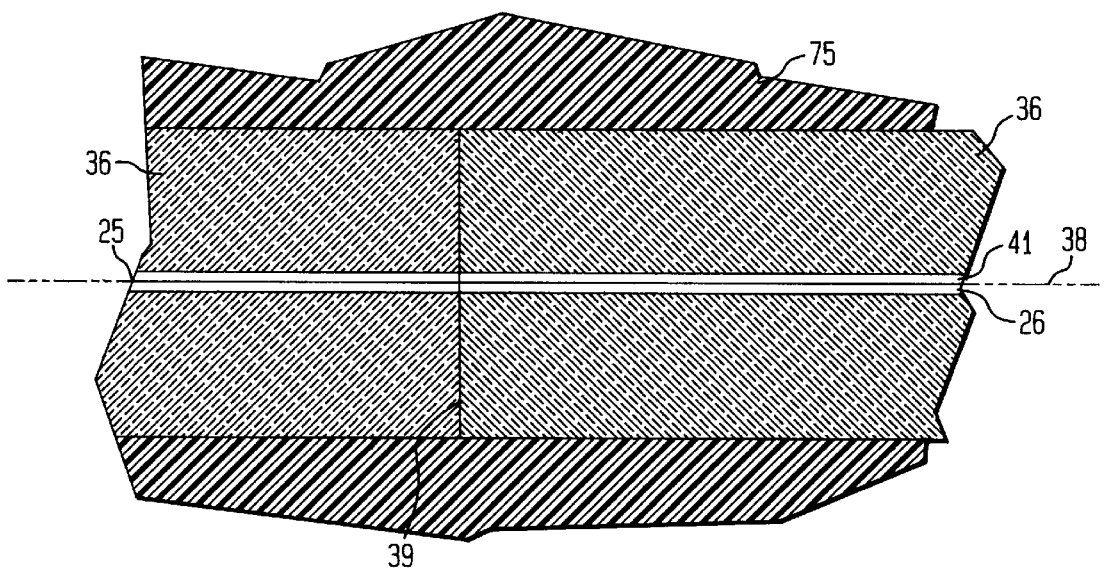

Referring to FIGS. 1A and 1E, it can be seen that the connection 21 comprises two optical fiber terminations 37. The connection 21 is such that longitudinal axes 38 of the terminations 37 are coaxial. In addition to an end portion of an optical fiber 26, each termination 37 comprises an optical fiber terminus, or plug, 36 having a passageway 41 (FIG. 1F) and being made typically of a ceramic material. The plug 36 has an outer diameter of about 2500 $\mu$m. An endface 39 of the plug 36 includes an opening of the passageway 41.

The coating 28, as well as the tube 31, strength member 33 and outer jacket 35, is removed from an end portion of an optical fiber 26 prior to its termination with a plug 36. Then, the end portion of the optical fiber 26 is inserted into the passageway 41 of each plug 36, such that the endface of the optical fiber 26 extends slightly beyond the endface 39 of the plug 36. The bared optical fiber has an outer diameter of about 125 $\mu$m, whereas the diameter of the passageway 41 is about 127 $\mu$m. Then, the end portion of the optical fiber 26 is secured within the passageway 41 of the plug 36 and the endfaces of the optical fiber and of the plug are ground and polished.

Each termination also includes a connector body 42 made of typically a plastic or metallic material, a compression spring 44, and a tubular housing 45 made of a metallic material. It should be observed that the plug 36, the connector body 42, and the housing 45 each have a cylindrical cross-section. The connector body 42 includes a separate orienting pin 43 which can be installed at any of an infinite number of positions in accordance with this invention and which projects radially from the longitudinal axis 38.

The connector body 42 includes a smaller diameter portion 46 (FIG. 1E) which extends through an opening 47 in an internally disposed collar 48 in the housing. A retaining washer 49 circumscribes the smaller diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body 42 within the housing 45.

Viewing again FIG. 1A, it can be seen that the housing 45 includes a longitudinally extending slot 55 which at its inner end communicates with a circumferentially extending slot 47. The slot 57 is formed so that the tubular wall of the housing which defines it includes a latching projection 58. These slots 55, 57 are used for securing a termination 37 to another portion of the connection 21.

Completing the termination 37, there is shown a portion 59 which extends from the housing 45 along the optical fiber cable in a conically-shaped configuration until it assumes the general cross-section of the cable. This portion of the connection 21 provides strain relief for the termination and insures that the cable can withstand repeated bends in use after interconnection with another cable without undue stresses being imparted to the optical fibers.

Each of the connector bodies 42 and plugs 36 is adapted to be received in a coupler 60. The coupler 60 includes a tubular member 62 having end portions 64 and 66 with each end portion including a longitudinally extending slot 67. In order to allow the connection 21 to be panel-mountable, the coupler 60 includes a center portion 68 which is threaded and which is adapted to be inserted in a hole (not shown) in a panel. A nut 71 is turned thereunto to secure the coupler to the panel. Also included in the coupler 60 at each end portion 64 and 66 thereof are assembly pins 73 which are displaced circumferentially from the slot 67 at that end.

In assembling the connection 21 which is shown in FIGS. 1A through 1F, an installer generally mounts the coupler 60 or otherwise positions it to receive the terminations 37. Mounted within the coupler 60 is a sleeve 75 (FIG. 1E). The sleeve 75 is adapted to receive the plugs 36 of the terminations 37 and is a means for aligning the outer surfaces of the plugs. The sleeve 75 is disposed within the coupler 60 such that it floats to allow for some movement of the plugs 36 when they are inserted into the coupler. Further, the sleeve 75 causes the longitudinal axes 38 of the plugs 36 mounted therein to be coaxial.

II. MEASUREMENT OF DISPARITY (E.G., UNDERCUT/PROTRUSION)

Figure 2:
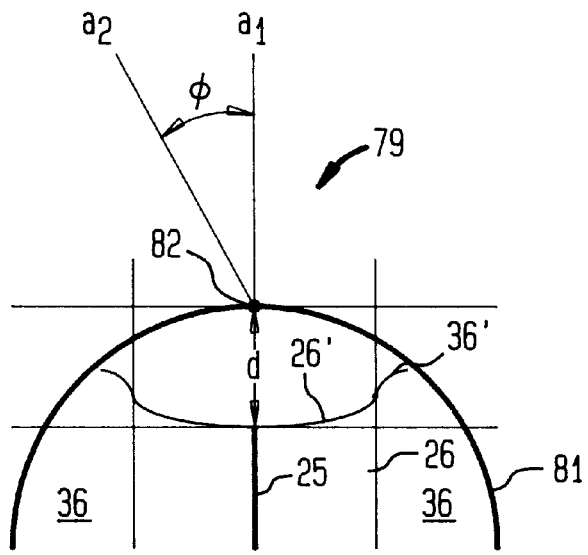
FIG. 2 is a graph illustrating measurement of a disparity d (e.g., undercut/protrusion) between a first surface (e.g., termination plug endface) and a second surface (e.g., fiber endface)

The manner in which the disparity or discontinuity between two surfaces is measured by the system and method of the present invention will now be described with reference to FIG. 2. FIG. 2 schematically shows a cross-section of the combination of the plug 36 and fiber 26. The circular curvature 81 in FIG. 2 represents the 2D cross-section of the desired 3D domed termination endface. The disparity d represents the displacement between the curve 81 and the fiber 26 along a longitudinal axis $a_1$ that runs longitudinally through the center of the fiber 26 (and fiber core 25).

If the endface 26' of the fiber 26 is recessed below the adjacent endface 36' of the surrounding termination plug 36, as is shown in FIG. 2, then the fiber 26 is said to be "undercut" with respect to the termination endface 79. In contrast, if the endface 26' of the fiber 26 protrudes outwardly from the endface 36' of the plug 36 (i.e., endface 26' resides above curve 81 in FIG. 2), then the fiber 26 is said to exhibit "protrusion" with respect to the termination endface 79. For purposes of simplicity, only the undercut configuration is shown in FIG. 2, but it should be understood that the methodology for measuring the disparity d applies also to the protrusion configuration.

In either of the aforementioned scenarios, the disparity d is automatically measured by the system of the present invention and can be used for quality control or other purposes. In this regard, if the disparity d falls within an acceptable threshold, then the termination endface 79 is adequate. Otherwise, if the disparity d is too great and falls above the threshold, then the termination endface 79 is unacceptable and the associated termination 37 is inadequate and should be discarded. Furthermore, the quantitative data generated by the system from a sequence of terminations 37 processed by a given machine, process, or operator may then be used to measure the stability of the machine, process, or operator, or to predict when the machine, process, or operator is out of control.

III. AUTOMATIC INSPECTION SYSTEM

Figure 3:
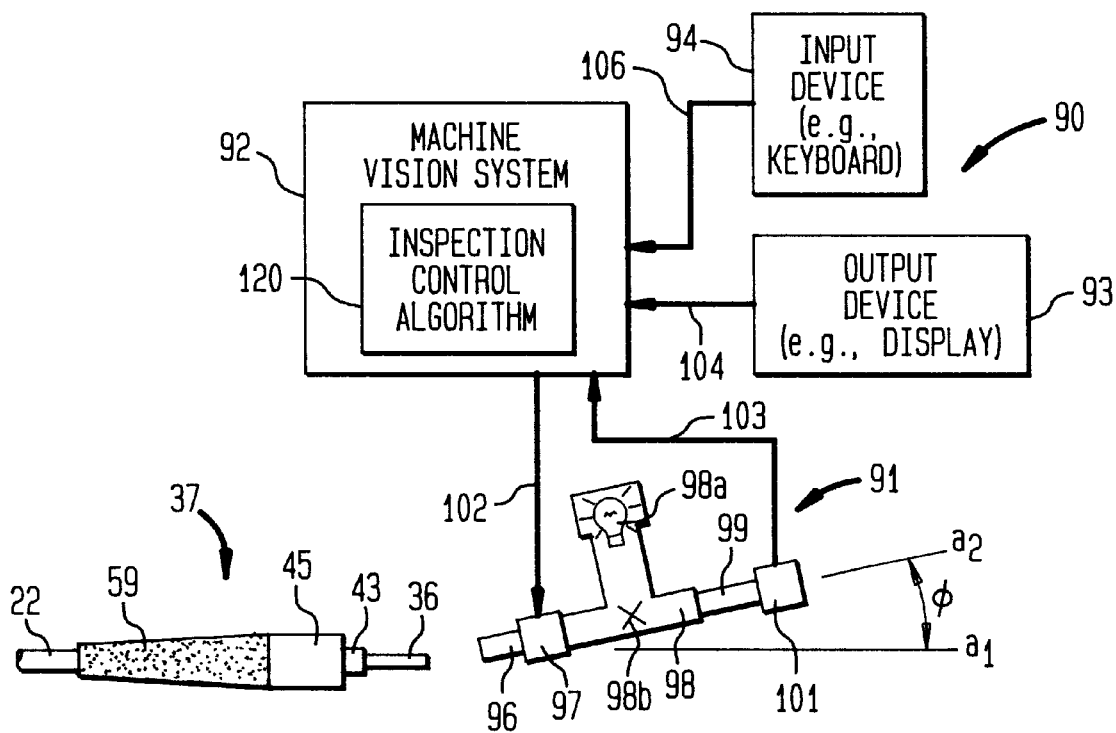
FIG. 3 is a schematic diagram showing the automatic inspection system of the present invention.

FIG. 3 illustrates an automatic inspection system 90 in accordance with the present invention. The automatic inspection system 90 can be used to determine the relative disparity between two surfaces, particularly the relative disparity between an optical fiber 26 and its adjacent concentrically surrounding termination plug 36.

In architecture, the inspection system 90 comprises a measurement apparatus 91 that runs longitudinally along an axis $a_2$ for contactlessly observing the relevant target surfaces 26', 36' and generating associated data, a machine vision system 92 for controlling and monitoring the measurement apparatus 91, an output device 93 driven by the machine vision system 92 for providing a user with disparity information relative to the plug 36 and fiber 26, and an input device 94 for enabling a user to provide control/configuration information to the machine vision system 92.

The measurement apparatus 91 comprises an optical objective 96 that interfaces light with the relevant target surfaces 26', 36'. The objective 96 resides along the axis $a_2$ and is pointed toward a target 82 (FIG. 2), where axes $a_1$, $a_2$ intersect, in order to capture an image of endface 79 (includes fiber endface 26' and termination endface 36'). In the preferred embodiment, the objective 96 is a model MPlan 20DI 323270, which is commercially available from Nikon, Inc., Japan.

A focus adjustment mechanism 97 supports the objective 96 and is adapted to move the objective 96 along the axis $a_2$. A suitable commercially available focus adjustment mechanism 97 is a model P721.00 piezoelectric element, which is manufactured by Physik Instrumente, France. The foregoing piezoelectric element can selectively move the objective 96 a distance of about 100 $\mu$m (with a resolution of 3 nm) based upon a closed loop control that receives a voltage input of between 0 and 100 volts. When 0 volts is supplied to the piezoelectric element 97, the objective 96 is maintained at its greatest distance (is completely retracted) from its target along axis $a_2$, whereas when 100 volts is supplied to the piezoelectric element 97, the objective 96 is the closest distance (full extension) to the target along axis $a_2$.

An interferometer 98 supports the piezoelectric element 97 and is situated along the axis $a_2$. A suitable interferometer is the model ME-3000, which is manufactured by and commercially available from Micro Enterprises, Inc, U.S.A. The interferometer 98 has an internal light source 98$a$ and an internal light reflection apparatus 98$b$. It is known in the art that the interferometer 98 can be used to measure very small distances and thicknesses using known wavelengths of light. Generally, in the interferometer 98, a beam of light from the light source 98$a$ is separated into two opposing beam parts by partial reflections at the reflection apparatus 98$b$. One beam part is projected against the target, returns to the interferometer 98, and is reunited with the other beam part at the reflection apparatus 98$b$. Because the beams have traversed different optical paths, the two components produce interference in the image of the target. Furthermore, the interference can be utilized to measure very small distances or thicknesses.

In accordance with a significant feature of the present invention, the objective 96 and the interferometer 98 are mounted so that the combination views the target at an angle $\phi$. Said another way, the combination is mounted so that the axes $a_1$, $a_2$ intersect at an angle $\phi$, as illustrated in FIGS. 2 and 3. In the preferred embodiment, the angle $\phi$ is about 3°, but can be varied at least between the range of approximately 2–9°. The angle $\phi$ of inclination enables a fringe pattern 112 (comprised of fringes, or bands; see FIGS. 4A–4C) to be superimposed over the image generated by the interferometer and viewed by the objective 96. It should be noted that prior art uses of an interferometer 98 do not position the target image at an angle $\phi$ and do not produce a fringe pattern 112 having a plurality of fringes 113 as in accordance with the present invention. In fact, prior art uses produce interference patterns in the form of a bull's eye.

A video adaptor 99 is mounted to the interferometer 98 along the axis $a_1$ and includes a combination of one or more optical lenses that allows for tuning of an image projected from the interferometer 98. In essence, the video adaptor 99 permits clarity focusing of interferometric fringes associated with the image. In the preferred embodiment, the video adaptor 99 also magnifies the image from the interferometer 98 by 25x. Once the measurement apparatus 91 is mounted, the lenses associated with the video adapter can be fixedly arranged. A suitable video adaptor is a model Nikon 30255, which is commercially available from Nikon, Inc, Japan.

A camera 101 is secured to the video adaptor 99 and receives and encodes images projected to it from the video adaptor 99 and ultimately from the interferometer 98. The camera 101 may be, for example but not limited to, a charge-coupled device (CCD), such as a model KPM1, which is commercially available from Hitachi, Japan. The CCD camera 101 comprises a pixel array for receiving light. Moreover, the pixel array encodes the image by generating analog voltage signals proportional to the intensity of light at each pixel of the CCD, as is well known in the art.

The machine vision system 92 controls the piezoelectric element 97 via a piezo control signal 102, which in the preferred embodiment is a voltage signal in the range of between 0 and 100 volts, in order to cause the piezoelectric element 97 to move the objective 96 along the axis $a_2$. Further, the machine vision system 92 receives the analog voltage signals 103 from the camera 101 that are used by the machine vision system 92 to construct a digital image in a frame buffer (not shown). The image can be any suitable size, such as 512×480 pixels, for driving the output device 93, and a pixel value, or intensity, corresponding with each pixel in the image can exhibit any one of 256 possible values.

The machine vision system 92 can be implemented with any suitable logic, processing mechanism(s), or combination thereof. A suitable machine vision system 92 can be implemented with a model NCR 3333 computer, which is commercially available from NCR Corp., USA, equipped with a machine vision processor. The machine vision processor could be, for example but not limited to, a model ITI ITEX OFG (overlay frame grabber) image processing card that is commercially available through Microdisc, Inc., U.S.A. Furthermore, in the preferred embodiment, the machine vision system 92 further includes an amplifier for producing the piezo control signal 102 within the aforementioned voltage range of 0–100 volts from control signals received from the NCR 3333 computer. A suitable amplifier is a model E860.10 amplifier manufactured by Physik Instrumente, France.

The output device 93, which is optional, can be any suitable mechanism for supplying information to the user. For example, the output device 93 can be a conventional display or printer. Aside from receiving diagnostic and operational parameters and perhaps an initiation signal from the user, the system 90 is fully automatic. In fact, the system 90 could be set up to completely automatically communicate to another automated system.

The input device 94, which is also optional, can be any suitable mechanism for receiving prompts or information from the user and conveying the information to the machine vision system 92, as indicated by reference arrow 106. As examples, the input device 94 could be a conventional computer keyboard, mouse, etc.

The inspection system 90 of FIG. 3 may be mounted in a commercial-scale optical fiber manufacturing facility for monitoring the quality control of fiber optic terminations 37. The terminations 37 could be disposed in view of the objective 96 by manual human manipulation, or alternatively, by an automated mechanism. As an example, the termination 37 could be situated upon a conveyor, along with perhaps many other terminations 37, and moved in front of the objective 96 so that a measurement can be automatically made by the inspection system 90.

IV. DISPLAY IMAGES

Figure 4A:
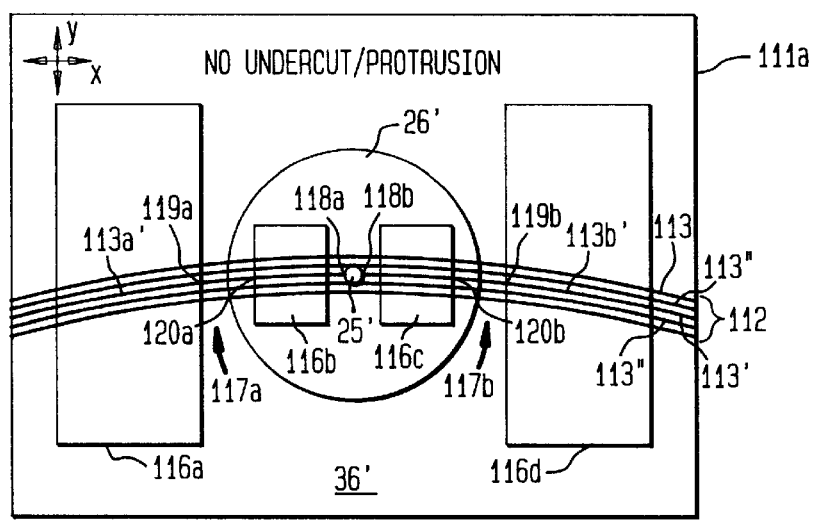
FIGS. 4A through 4C show various display images generated by the display of FIG. 3; particularly.
Figure 4B:
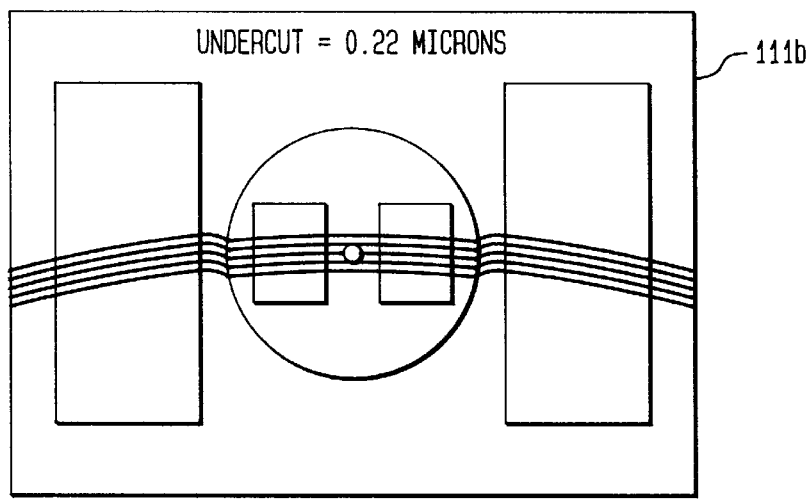
Figure 4C:
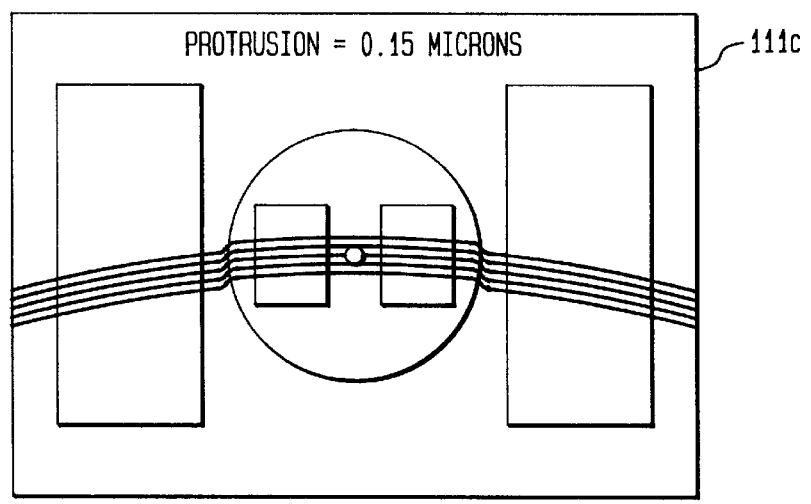

FIGS. 4A through 4C show respective images 111a–111c which can be generated by the machine vision system 92 (FIG. 3) and driven to a display 93 in the preferred embodiment. The features illustrated in the images 111a–111c are merely an example of the type of information that can be provided to a user. During proper operation, the images 111a–111c preferably show at least a portion of the termination endface 79, i.e., the fiber endface 26' and at least part of the surrounding termination plug endface 36'. Moreover, the images 111a–111c show a pattern 112 of generally horizontal, dark, interferometric fringes, or bands, 113 passing over both the fiber endface 26' and at least part of the plug endface 36'. In these figures, as an example and for simplicity, only five fringes 113 are shown in the pattern 112. However, more than five fringes 113 can in fact be generated by the measurement apparatus 91 (FIG. 3).

The location of the interferometric pattern 112 within the expanse of the images 111 is a function of the distance between the objective 96 (FIG. 3) and the target 82 (FIG. 2).

The spacing between the fringes 113 is a function of (a) the angle φ of inclination of the combination of the objective 96 and interferometer (FIG. 3) relative to the target 82, which is preferably fixed at approximately 3° in the preferred embodiment and (b) the light wavelength from the interferometric light source 98a.

The curvature of the fringes 113 within the images 111 is a function of the curvature of the termination endface 79 (FIG. 2). In other words, the radius of curvature of the termination endface 79 is directly proportional to the radius of curvature of the fringes 113 in the images 111.

Significantly, depth information and particularly the disparity d (FIG. 2) can be visualized and quantitatively determined from one or more of the fringes 113 within the pattern 112 by analyzing interference in the form of a displacement in the one or more fringes 113. More specifically, a visual change in the continuity of the fringes 113 as the fringes 113 run horizontally across the image 111 indicates a change in the disparity d. FIG. 4A illustrates the desired ideal scenario when the core 26 and the surrounding plug 36 are continuously domed and conform to the curve 81 (FIG. 2). FIG. 4B illustrates the scenario where the fiber 26 is undercut with respect to the plug 36. As is shown in FIG. 4B, the bands 112 are offset, or displaced, slightly downwardly in the region between the plug 36 and the fiber 26. FIG. 4C illustrates the scenario where the fiber 26 protrudes outwardly from the endface 36' (FIG. 2) of the plug 36. As is shown in FIG. 4C, the fringes 113 are again deflected as in the region between the plug 36 and the fiber 26. However, unlike in FIG. 4B, the fringes 113 in FIG. 4C are displaced slightly upwardly in the image 111c between the plug 36 and the fiber 26.

In the scenarios of FIGS. 4B and 4C, the extent of undercut and protrusion respectively is determined automatically and precisely by the system 90 (FIG. 3) by measuring the distance of displacement of any fringe 113, while taking into account the wavelength of the light from light source 98a and the fixed angle φ, which dictates the spacing between the fringes 113.

In the preferred embodiment, the interferometer 98 has a light source 98a that generates white light ($\lambda$=600 nm) that is projected against the target 82. Because white light is utilized to generate the images 111a–111c, the fringe pattern 112 will have fringes 113 with varying degrees of darkness intensity (the bright bands generally do not exhibit varying intensities). In order to minimize adverse effects resulting from noise, the inspection system 90 (FIG. 3) of the present invention causes a darkest fringe 113' of the pattern 112 to pass through the center of the fiber endface 26' (as well as core endface 25') and the disparity measurements are based substantially upon the darkest fringe 113'. Furthermore, when white light is utilized, the fringes 113 reside approximately 300 nm apart at the prescribed angle $\phi=3°$.

In order to further minimize the adverse effects resulting from noise and in order to optimize the speed of the machine vision system 92 (FIG. 3), multiple zones 116a–116d are implemented. The zones 116a–116d define the regions of the images 111a–111c where data is analyzed and used in the calculations concerning the determination of the disparity (undercut/protrusion). In the preferred embodiment, the zones 116a–116d are shown to the user by the display 93 along with information regarding curves within the respective zones 116a–116d.

In addition to the features illustrated in FIGS. 4A–4C, in the preferred embodiment, the images 111 further include specific numerical information regarding the disparity d, for instance and obviously not limited to, "NO UNDERCUT/PROTRUSION" as in FIG. 4A, "UNDERCUT=0.22 MICRONS" as in FIG. 4B, and "PROTRUSION=0.15 MICRONS" as in FIG. 4C. Moreover, obviously, the disparity information can take many suitable grammatical forms and can be spatially positioned virtually anywhere in the images 111.

V. INSPECTION CONTROL ALGORITHM

Figure 5:
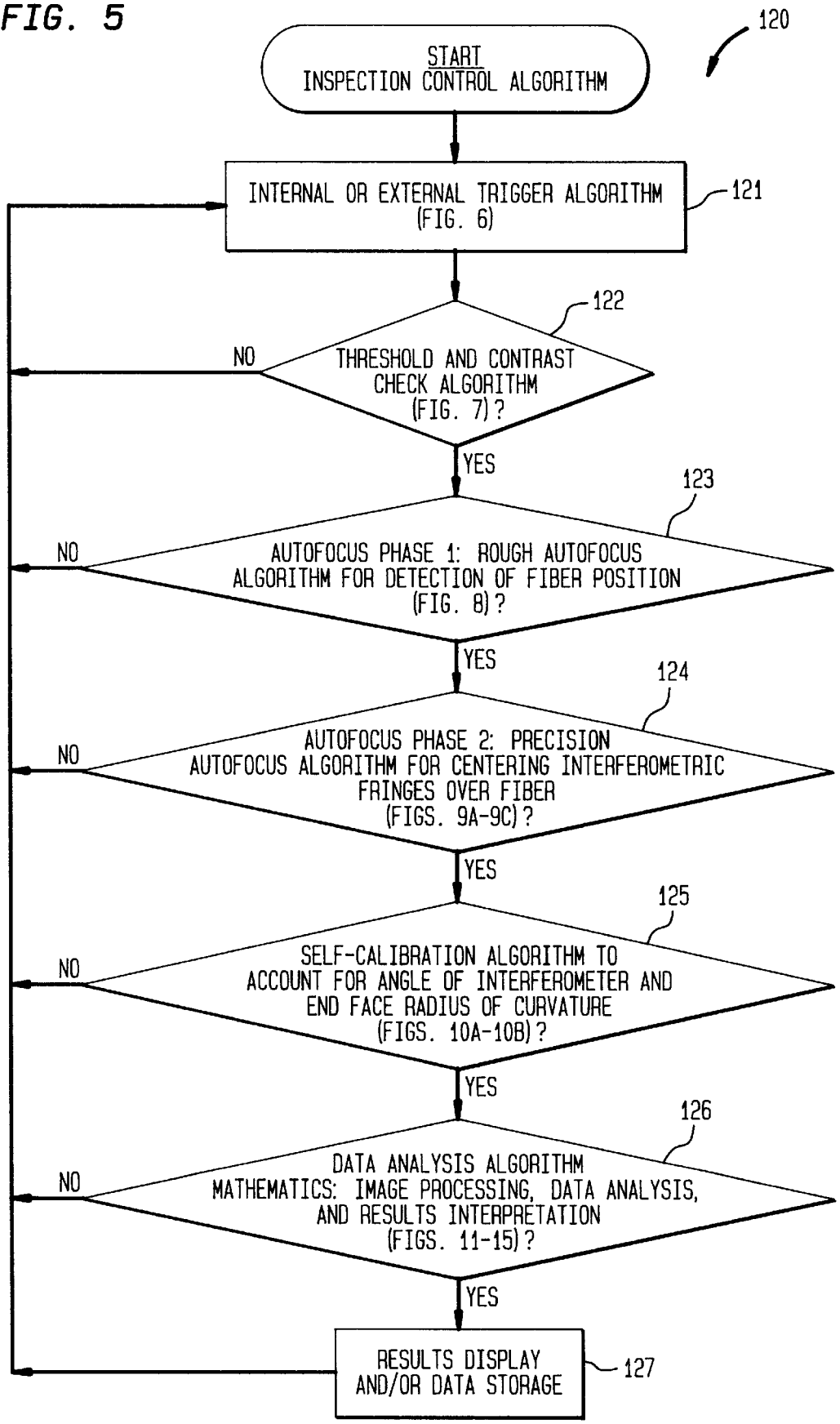
FIG. 5 is a flow chart illustrating the architecture and functionality of an inspection control algorithm associated with the machine vision system of FIG. 3.

A high level flow chart illustrating the overall architecture and functionality of an inspection control algorithm 120 is set forth in FIG. 5. The inspection control algorithm 120 can be implemented in software, hardware, or a combination thereof. The inspection control algorithm 120 is preferably implemented via a computer program, which comprises a list of executable instructions, stored in a memory (not shown) associated with the machine vision system 92, which is a computer in the preferred embodiment, and executed by a processor (not shown) associated with the machine vision system 92.

Figure 6:
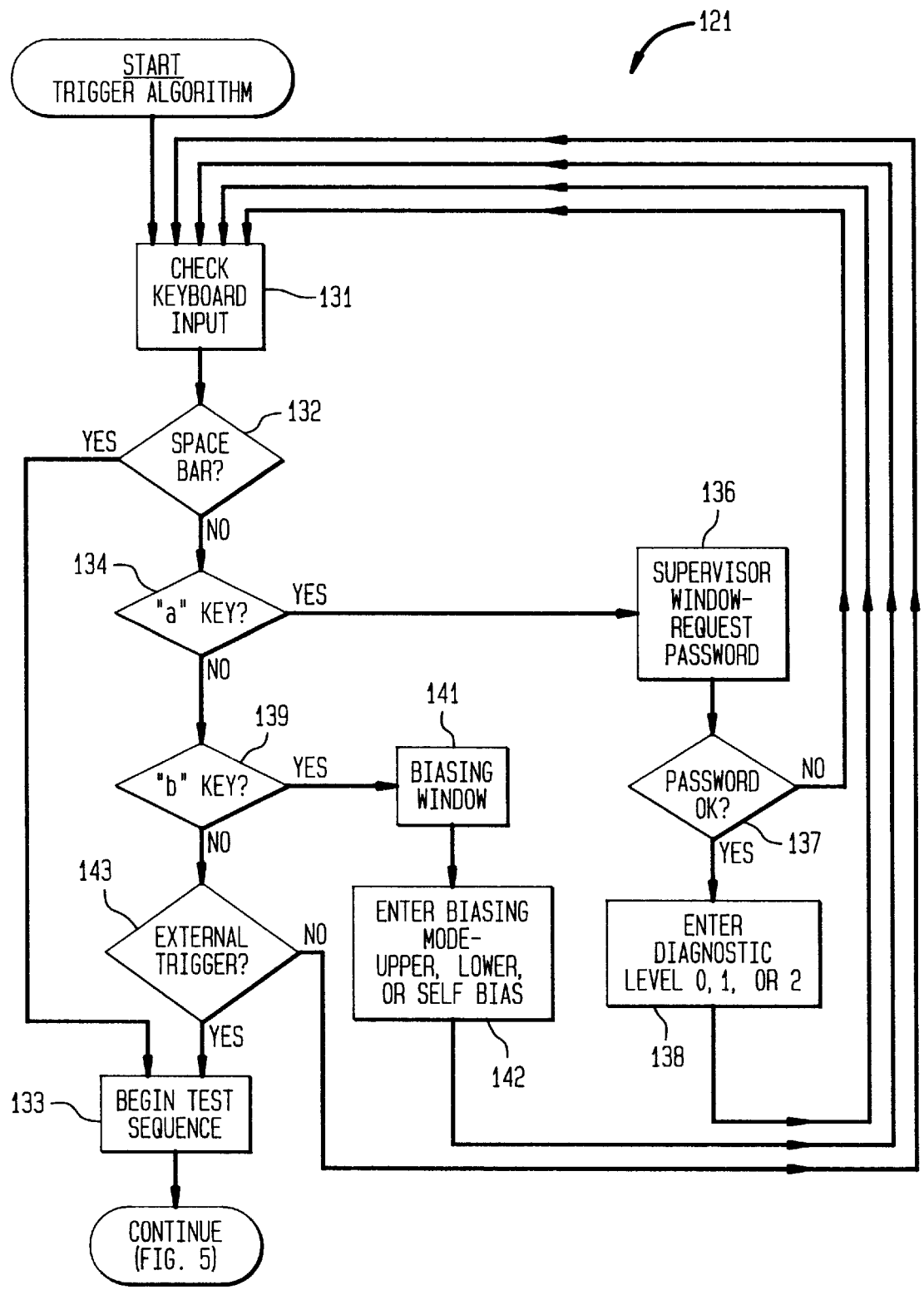
FIG. 6 is a flow chart illustrating the architecture and functionality of a trigger algorithm associated with the inspection control algorithm of FIG. 5.

Initially, in the inspection control algorithm 120, a trigger algorithm is employed, as set forth in flow chart block 121. Essentially, the machine vision system 92 waits to be prompted by the user to perform a disparity measurement. The trigger algorithm 121 will be further described hereinafter with respect to FIG. 6.

Figure 7:
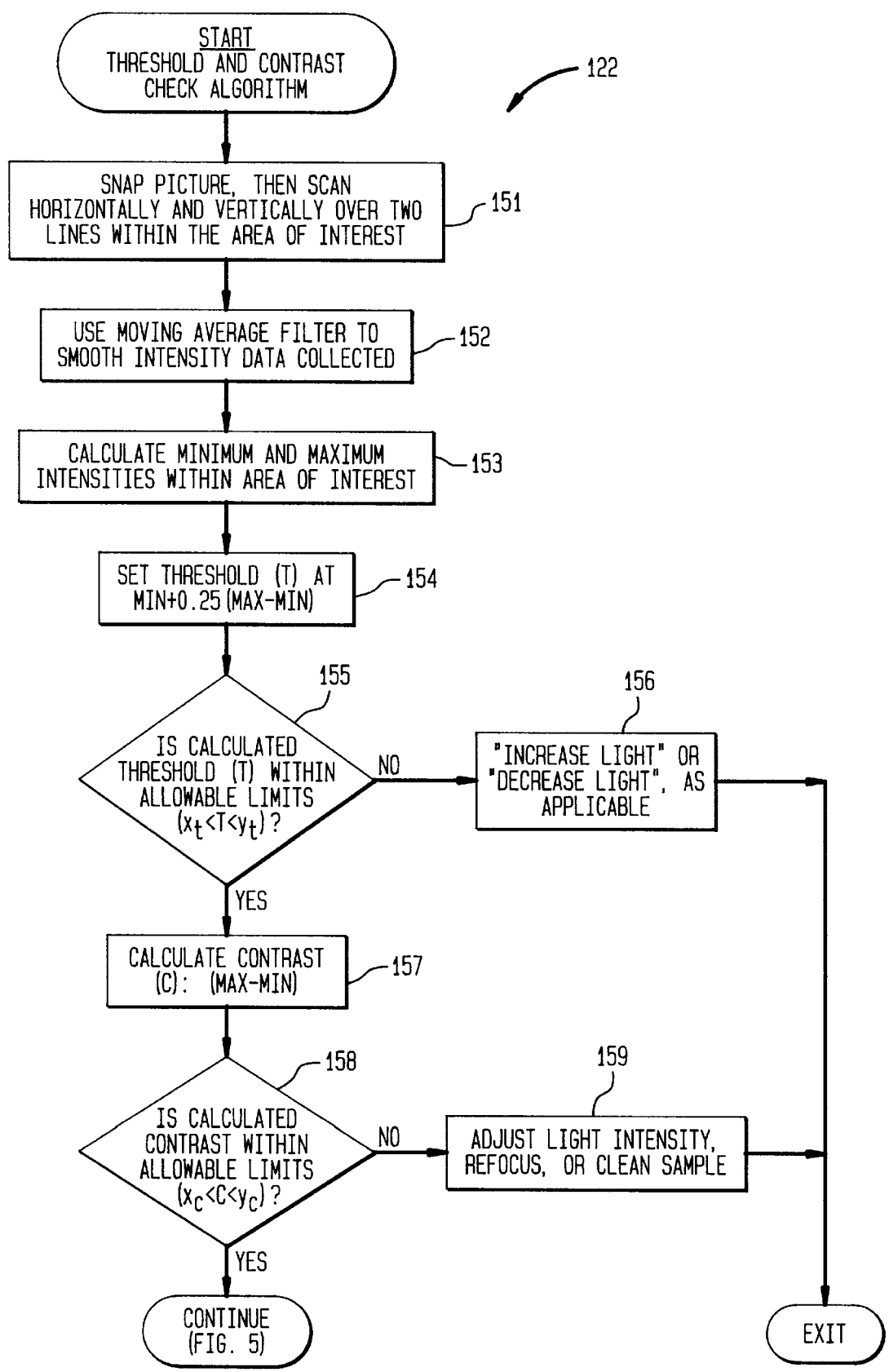
FIG. 7 is a flow chart illustrating the architecture and functionality of a threshold/contrast check algorithm associated with the inspection control algorithm of FIG. 5.

A threshold/contrast check algorithm is next employed, as set forth in flow chart block 122. In general, the threshold/contrast check algorithm 122 determines whether there is enough contrast in the image 111 to find the location of the fiber 26. In this regard, the algorithm 122 compares the gray level of the background with the gray level of the fiber 26. The threshold/contrast check algorithm 122 will be further described hereafter relative to FIG. 7.

The inspection system 90 employs a novel two-phase autofocus algorithm for positioning the fiber endface 26' in the center of the display image and the darkest fringe 113' over the core endface 25' of the fiber 26. The two-phase autofocus process is characterized by minimal calculations, high speed, and repeatability that far exceeds human performance. In this regard, a rough autofocus algorithm, as set forth in flow chart block 123, is implemented after the threshold/contrast check algorithm 122. The rough autofocus algorithm 123 detects the location of the fiber 26 within an image 111. The fiber 26 may not be situated in the center of the image 111 due to an imprecise support structure. Generally, in accordance with the rough autofocus algorithm 123, the piezoelectric element 97 is initialized so that the objective 96 is the furthest distance away from its target. Then, the piezoelectric element 97 is actuated by the machine vision system 92 (FIG. 3) so that the objective 96 is moved closer to its target 82 (FIG. 2). During this operation, the interferometric pattern 112 (FIGS. 4A) is moved vertically, upwardly or downwardly, across the image 111. After the pattern 112 has been vertically centered within the image 111, the pattern 112 is moved slightly away from the vertical center by a predetermined distance, and then the fiber 26 is located relative to the x,y coordinate system (FIG. 4A) of the vision system frame configuration. The rough autofocus algorithm 123 will be further described in detail with reference to FIG. 8.

Next, a precision autofocus algorithm is implemented, as set forth in flow chart block 124. The precision autofocus algorithm 124 essentially centers the interferometric fringes 113 precisely over the fiber endface 26' so that the darkest fringe 113' passes through the core endface 25' (FIG. 4A). The precision autofocus algorithm 124 will be described in detail hereinafter with respect to FIGS. 9A–9C.

A self-calibration algorithm is now employed, as indicated in flow chart block 125. The self-calibration algorithm 125 determines the spacing (in pixels) between the fringes 113 that is ultimately utilized in determining the disparity d. Significantly, the algorithm 125 accounts for changes in the angle $\phi$ of the objective 96 (FIG. 3) as well as the interferometer 98 (FIG. 3) relative to the longitudinal axis $a_1$ of the target 82 (FIG. 2), i.e., the view of the fiber endface 26' and surrounding plug endface 36'. Further, the self-calibration algorithm 125 accounts for variations in the radius of curvature of the fiber 26. The self-calibration algorithm 125 will be described in detail with reference to FIGS. 10A–10B.

After implementation of the self-calibration algorithm 125, a data analysis algorithm is employed, as set forth in flow chart block 126. The data analysis algorithm 126 determines the disparity d (FIG. 2; undercut/protrusion) by performing image processing, data analysis, and interpretation of the data analysis. In general, a first circle is mathematically fitted to the plug endface 36' and a second circle is fitted to the fiber endface 26'. Moreover, the difference between the location of the first and second circles, as measured along a line approximately normal to the fiber endface 26' at a point that intersects the center of the fiber core 25 (i.e., as measured at the x coordinate of the fiber core center), is computed. Moreover, the disparity d (FIG. 2) is computed based upon the aforementioned difference, the measured fringe spacing (in pixels), and the known wavelength of the interferometer light (white light in the preferred embodiment). The data analysis algorithm 126 will be described in detail hereinafter with reference to FIGS. 11–15.

Finally, as indicated in a flow chart block 127, the results generated by the data analysis algorithm 126, which includes the disparity d (undercut/protrusion), can be driven to the display 93 in any suitable presentation configuration by the machine vision system 92 (FIG. 3), provided to a data storage device, and/or provided to another automated system. In the preferred embodiment, an image 111, similar to one of those shown in FIGS. 4A–4C, is generated by the machine vision system 92 (FIG. 3) and passed to the display 93 (FIG. 3).

A. Trigger Algorithm

The trigger algorithm 121 enables a user to initiate inspection of the target 82 (FIG. 2) and to modify operational parameters to enhance accuracy. First, the trigger algorithm 121 implements a check keyboard loop wherein the trigger algorithm 121 monitors the input device 94 (FIG. 3) for a cue from the user. In the preferred embodiment, the trigger algorithm 121 monitors the keys of a conventional keyboard 94, and once a key stroke is detected by the trigger algorithm 121, the trigger algorithm 121 determines whether particular keys have been depressed.

The trigger algorithm 121 determines whether the space bar has been depressed, as indicated in the decisional flow chart block 132. If the space bar has been depressed on the keyboard 94 (FIG. 3), then the trigger algorithm 121 begins the test sequence, as indicated in flow chart block 133. If it is determined that the space bar has not been depressed, then the algorithm 121 determines whether key "a" has been depressed, as indicated in the decisional flow chart block 134. A keystroke "a" by the user will cause the algorithm 121 to enter a mode for acceptance of a diagnostic level.

If the key "a" has been depressed, then the algorithm 121 will perform a security function by requesting the user to enter a password, as indicated in the flow chart block 136. If the password does not match a preexisting stored password, then the trigger algorithm 121 returns back to the check keyboard loop of flow chart block 131, as indicated by the decisional flow chart block 137. If the entered password matches the stored password, then the algorithm prompts the user to enter a diagnostic level, as indicated in the flow chart block 138.

In the preferred embodiment, the inspection control algorithm 120 (FIG. 5) operates in one of three possible diagnostic modes, denoted by diagnostic level 0, 1 or 2. Diagnostic level 0 corresponds with the most compressed form of showing the undercut/protrusion results and corresponds to what is shown in FIGS. 4A–4C. Diagnostic level 1 shows all the information corresponding with diagnostic level 0, but further includes statistical information regarding the matching of curves to spheres. In essence, the information indicates the degree to which the results can be relied upon. Finally, when the inspection control algorithm 120 (FIG. 5) is operated in diagnostic level 2, very detailed information regarding the undercut/protrusion measurement is provided to the user. Moreover, the user is prompted during calculations so that the calculations can be manipulated, if desired, by the user. After the diagnostic level has been entered by the user, the algorithm 121 returns to its initial state, as indicated at flow chart block 131.

If key "a" has not been depressed, then the algorithm 121 determines whether key "b" has been depressed, as indicated in flow chart block 139. If key "b" has been depressed, then the algorithm 121 enters a development setup routine, as indicated in flow chart blocks 141, 142. The development setup routine enables a user to modify the manner in which calculations are automatically performed by the inspection control algorithm 120. This feature is desirable in situations where the undercut/protrusion is drastic, and consequently, the fringes 113 overlap or are close to overlapping in a transition region between the fiber endface 26' and the plug endface 36'.

As indicated in flow chart blocks 141, 142, the user is prompted to enter a biasing mode. In the preferred embodiment, three biasing modes are available: upper, lower, or self-bias. In the upper mode, the inspection control algorithm 120 (FIG. 5) will select the upper option when a 50/50 decision is encountered. In the lower mode, the algorithm 120 will select the lower option when a 50/50 decision is encountered. Finally, in the self-bias mode, the algorithm 120 will operate normally, and it will make decisions based upon predefined settings. After the biasing mode has been entered by the user, the trigger algorithm 121 of FIG. 6 returns to the check keyboard loop, as indicated in flow chart block 131.

If the trigger algorithm 121 determines that the key "b" has not been depressed, then the trigger algorithm 121 determines whether there has been an external trigger, as indicated in flow chart block 143. An external trigger can be, for example, a contact closure from a programmable logic controller (PLC). If it is determined that an external trigger exists, then the trigger algorithm 121 begins the test sequence, as indicated in flow chart block 133. However, if it is determined that an external trigger does not exist, then the trigger algorithm 121 returns to the check keyboard loop, as indicated in flow chart block 131.

B. Threshold/Contrast Check Algorithm

As mentioned previously, the threshold/contrast check algorithm 122 basically ensures that there is enough contrast in the image to analyze the fiber 26 with respect to the plug 36. Initially, the magnification of the data measurement apparatus 91 is set very high to ensure capture of the fiber 26 in the image 111, and the image 111 is not focused. Worth noting is that although the fiber 26 can be seen and detected, the fringe pattern 112 (FIG. 4A) is not necessarily visible and detectable at this time.

As indicated in flow chart block 151, an image 111 is sampled by the measurement apparatus 91 (FIG. 3) and forwarded to the machine vision system 92 (FIG. 3). After the image 111 is sampled, a horizontal line and a vertical line that cross over both the fiber endface 26' and the plug endface 36' are retrieved and isolated for analysis. Because the magnification of the image 111 is so high, virtually any horizontal line and any vertical line within a predetermined search area may be retrieved from the image 111.

Next, pursuant to flow chart block 152, each of the horizontal and vertical lines are filtered to remove noise. In this regard, a moving average filter is employed to smooth intensity data along each line. More specifically, each pixel value along each line is replaced by an average pixel value computed by averaging a particular number of neighboring pixel values.

The minimum and maximum pixel values along each of the lines is then identified, as indicated in the flow chart block 153. This operation is accomplished by comparing the pixel values along the lines to each other.

In accordance with flow chart block 154, a threshold $T_0$ is determined to serve as the trigger point for determining lighter and darker regions. This procedure is sometimes referred to as "segmentation." In the preferred embodiment, the threshold $T_0$=min+0.25 (max−min), where max is the grey scale value (0–255) of the lightest pixel and where min is the grey scale value of the darkest pixel.

As indicated in the flow chart block 155, a determination is made as to whether the calculated threshold $T_0$ is within allowable limits. Essentially, in this regard, it is determined whether the threshold $T_0$ is between two predefined values $x_t$, $y_t$. If it is determined that the threshold $T_0$ is not within the foregoing predefined values, then the threshold/contrast check algorithm 122 causes the machine vision system 92 (FIG. 3) to prompt the user over the display 93 (FIG. 3) to indicate that an increase or decrease in light is needed, as applicable, as denoted in flow chart block 156. Moreover, after the aforementioned prompt to the user, the algorithm 122 terminates. Conversely, if it is determined that a threshold $T_0$ is within the allowable limits $x_t$, $y_t$, then a particular contrast C is computed, as indicated in the flow chart block 157.

The contrast is calculated by subtracting the minimum pixel value from a maximum pixel value. After calculation of the contrast C, it is determined whether the contrast C falls within allowable limits. The reason for this operation is to ensure that a range of pixel values is available both above and below the threshold $T_0$. Specifically, it is determined whether the contrast C is between predefined contrast values $x_c$, $y_c$. If it is determined that the contrast C is not within the aforementioned predefined values $x_c$, $y_c$, then the threshold/contrast check algorithm 122 causes the machine vision system 92 to prompt the user via the display 93. The prompt informs the user to adjust the light intensity, refocus, or clean the sample, as indicated in the flow chart block 159. After the foregoing prompt to the user, the algorithm 122 and inspection control algorithm 120 end. If it is determined that the contrast does fall within the allowable limits $x_c$, $y_c$, then the threshold/contrast check algorithm 122 transfers to the rough autofocus algorithm 123 of FIG. 8.

It should be noted that the use of only one horizontal line and only one vertical line in order to determine contrast optimally minimizes the number of computations which must be performed. Further, other processes are known for determining contrast. As an example, the entire image 111 could be analyzed via a histogram so as to determine a range of values and particularly, maximum and minimum values. However, the foregoing procedure is computationally intensive, as compared to the preferred embodiment.

C. Rough Autofocus Algorithm

The rough autofocus algorithm 123 will now be described in detail with reference to FIG. 8. The rough autofocus algorithm 123 essentially moves the fringe pattern 112 into the center of the image 111, then moves the pattern 112 a predefined distance away from the center 111, and then determines the location of the fiber endface 26' relative to the pattern 112.

Initially, as indicated in the flow chart block 161, the piezoelectric element 97 (FIG. 3) is defocused by the machine vision system 90 so that the objective 96 is the furthest distance away from the target 82. Next, the piezoelectric element 97 is controlled to move the objective 96 by a step having step size $n_0$ (200 nm in the preferred embodiment) toward the target, as indicated in the flow chart block 162. After the objective 96 has been moved by the $n_0$ step, an image 111 of the target 82 is analyzed. A two dimensional (2D) rough autofocus grid is positioned in the center of the image 111 (not in the center of the fiber endface 26'). Moreover, all pixel intensity values located on the rough autofocus grid are collected, and the sum of their gradients is calculated, as indicated in the flow chart block 163.

As delineated in the flow chart block 164, the rough autofocus algorithm 123 next makes a determination as to whether the fringe pattern 112 is vertically centered in the image 111 based on the gradient sums. If the fringe pattern 112 is not centered, then the rough autofocus algorithm 123 again moves the objective 96 by a $n_0$ step and the aforementioned analysis continues until the fringe pattern 112 is centered.

After the fringe pattern 112 is centered vertically in the image 111, the objective 96 is moved back away from its target 82 by a predefined distance to defocus the image, as indicated in the flow chart block 165. The foregoing operation causes the fringe pattern 112 to be moved a predetermined distance away from the center of the image 111.

A search is now performed for the position of the fiber endface 26', which may not necessarily be in the center of the image 111. A gray level search of the fiber boundary of fiber endface 26' is performed. Disparities in intensity values of adjacent pixel areas indicate the boundary. Next, a circle is fitted to the collected boundary points and the center of the circle is determined. There are many conventional techniques known for determining the center of a circle. In the preferred embodiment, a Hough Transform is utilized to determine the location of the circle center (also the location of the fiber core endface 25'). Use of the Hough Transform to determine a circle center is described in detail in U.S. Pat. No. 5,179,419 to Palmquist et al., particularly at column 10. Use of the Hough Transform is desirable because it helps to eliminate noise and results in a more robust system.

Based upon the location of the fiber core endface 25' and the fiber boundary, a 2D precision autofocus grid is defined in the image 111 so that the fiber core endface 25' is centrally located within the grid. The focus parameters (i.e., the last voltage excitation state of the piezoelectric element 97) pertaining to the 2D precision autofocus grid and the newly determined location (x, y coordinates) of the core endface 25' within the foregoing 2D grid are placed into a memory buffer associated with the machine vision system 92, as indicated in flow chart block 167. The foregoing parameters are utilized in the next autofocusing phase by the precision autofocus algorithm 124 of FIGS. 9A through 9C. At the conclusion of the aforementioned operation, the operation of the rough autofocus fiber 123 is complete.

D. Precision Autofocus Algorithm

Figure 9B:
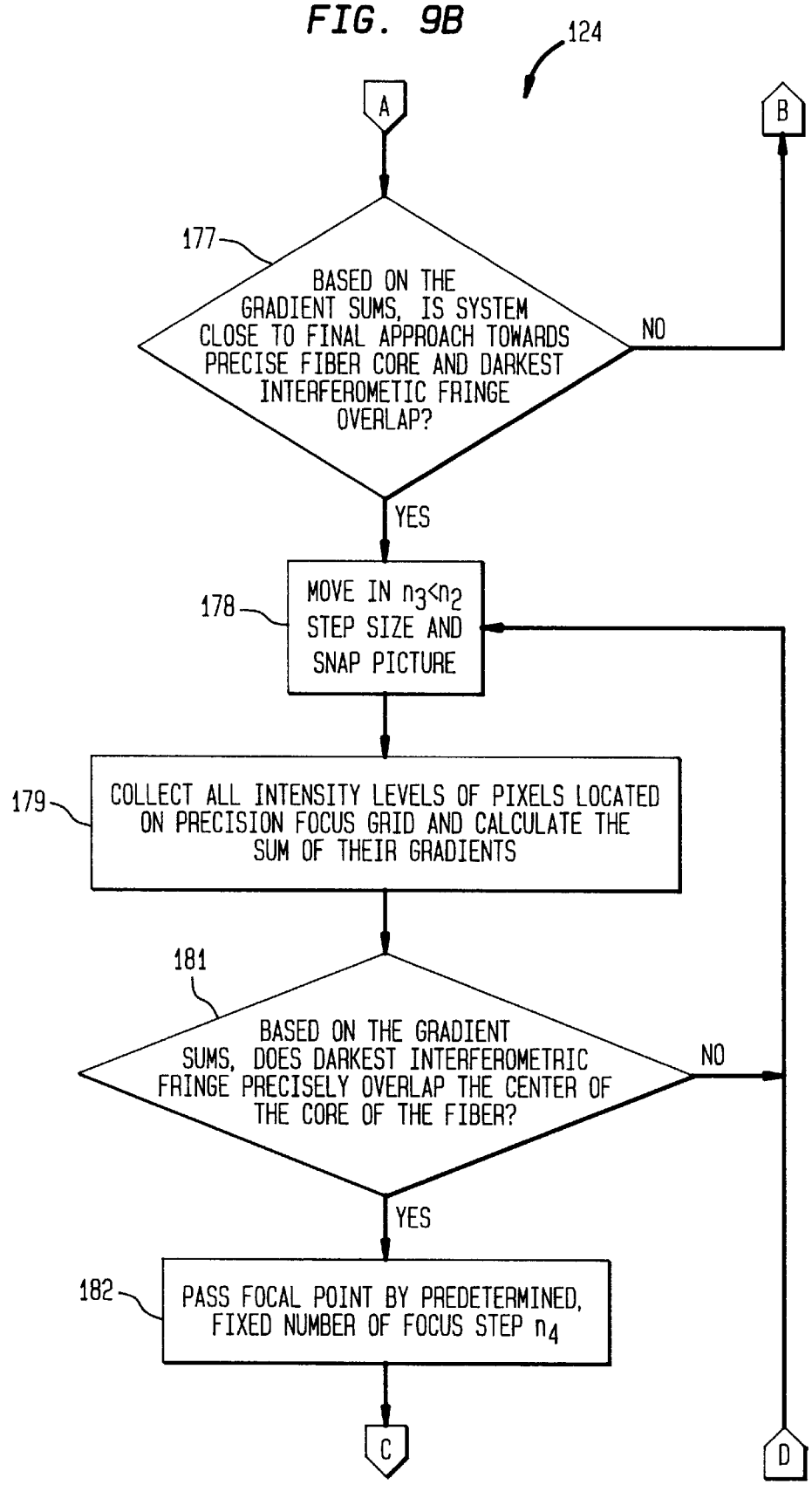
Figure 9C:
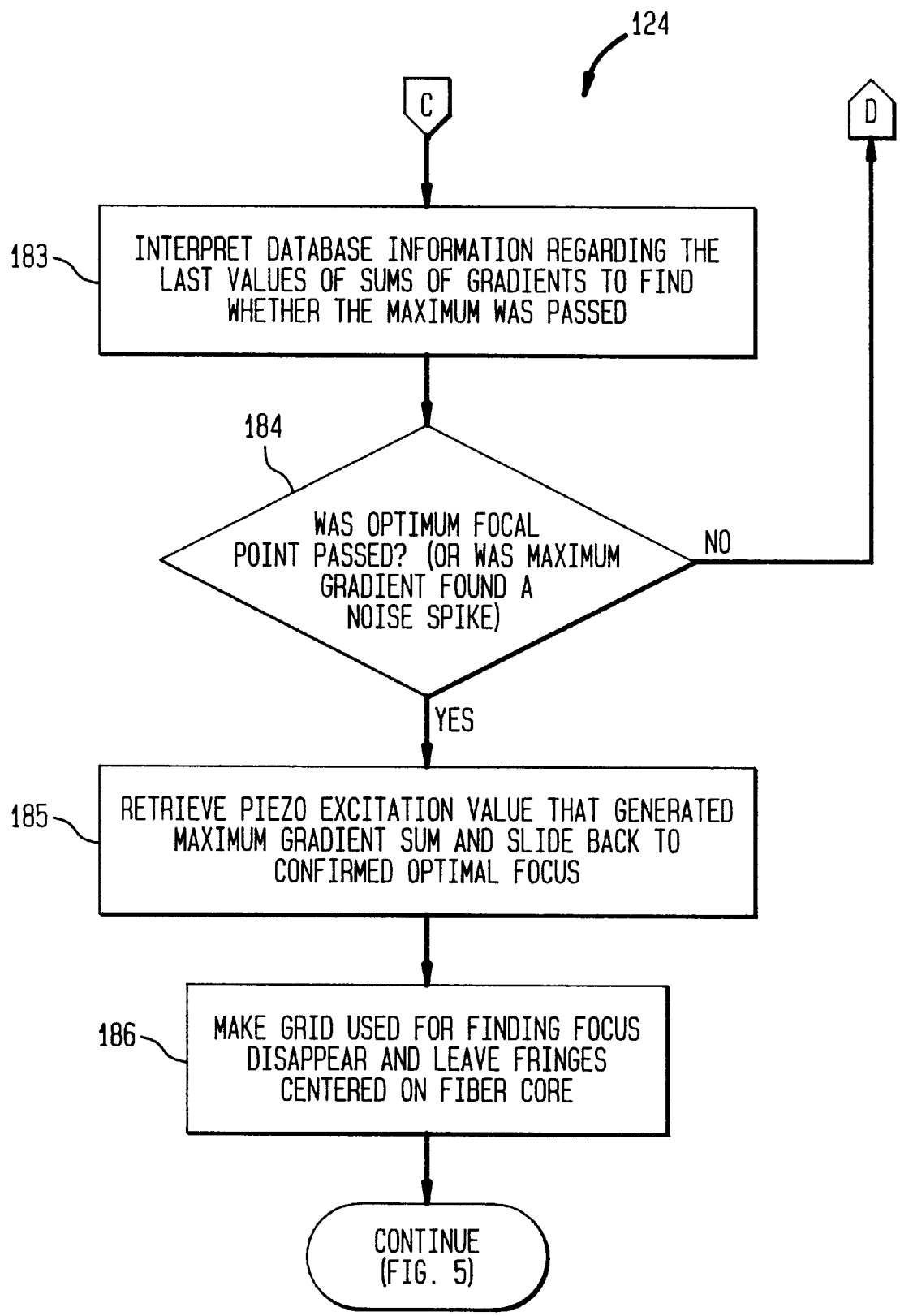

The architecture and functionality of the precision autofocus algorithm 124 is illustrated in detail in FIGS. 9A through 9C. The precision autofocus algorithm 124 essentially refocuses the interferometric fringe pattern 112 precisely over the fiber endface 26' (which is now in the center of the image 111).

In the preferred embodiment, the fringe pattern 112 is positioned over the fiber endface 26' so that the darkest fringe 113' (FIG. 4A) passes through the fiber core endface 25', and the disparity d is ultimately calculated by the data analysis algorithm 126 (FIG. 5) based upon analysis of the darkest fringe 113'. Recall that fringes 113 have varying intensities as a result of the use of white light in the interferometer 98. Positioning the darkest fringe 113' over the core endface 25' and making the disparity measurements based upon the darkest fringe 113' results in more reliable results because the darkest fringe 113' is the fringe 113 that is the least prone to producing an error. However, it should be noted that any of the fringes 113 could be positioned as described and used as the basis for making the desired disparity determination.

First, in the precision autofocus algorithm 124, as indicated in the flow chart block 171, the x, y coordinates pertaining to the fiber center and the specifications of the 2D precision autofocus grid (i.e., last voltage excitation state of the piezoelectric element 97) are retrieved from the memory buffer within the machine vision system 90. Further, the precision focus grid is centered over the fiber endface 26' so that the core endface 25' resides at the grid center.

Next, as indicated in flow chart block 172, the objective 96 is moved by the piezoelectric element 97 by a step with size $n_1$ (200 nm in the preferred embodiment), and an image 111 is captured. Movement of the objective 96 causes vertical movement of the interferometric pattern 112.

The pixel values located on the precision autofocus grid are collected, and the sum of their gradients is calculated, in accordance with flow chart block 173.

As indicated in flow chart block 174, a determination is now made as to whether the fringe pattern 112 has begun to overlap the core endface 25' of the fiber endface 26' based on the gradient sums. If the overlap has not commenced, then the precision autofocus algorithm 124 again moves the objective 96 by a $n_1$ step and the aforementioned analysis continues.

When it is determined that one of the dark fringes 113 of the fringe pattern 112 has begun to overlap the core endface 25', then the focusing of the fringe pattern 112 is slowed to a certain extent in order to provide for more accurate positioning and to enable generally exact placement of the darkest fringe 113' over the core endface 25'. In this regard, the objective 96 is now moved by a $n_2$ step (100 nm in the preferred embodiment), where the $n_2$ step is smaller than the $n_1$ step. After movement of the objective 96 by the $n_2$ step, an image 111 is sampled. The aforementioned steps are indicated in the flow chart block 175 of FIG. 9A.

The pixel values located on the precision focus grid are collected, and the sum of their gradients is calculated, as indicated in the flow chart block 176.

Pursuant to the flow chart block 177, an inquiry is made as to whether the darkest interferometric fringe 113' has overlapped the boundary of core endface 25' based on the gradient sums. If not, then the precision autofocus algorithm 124 causes the objective 96 to again move by the $n_2$ step, as set forth in flow chart block 175, and the aforementioned analysis continues.

When the answer to the foregoing inquiry at block 177 is in the affirmative, then the step size at which the objective 96 is moved towards the target 82 is again decreased. Along these lines, as indicated in the flow chart block 178, the objective 96 is controlled to move a step of size $n_3$ (50 nm in the preferred embodiment), where the $n_3$ step is smaller than the $n_2$ step, and then an image 111 is sampled.

The pixel values located on the precision autofocus grid are collected, and the sum of their gradients is calculated, as delineated in the flow chart block 179.

As denoted in the flow chart block 181, an inquiry is now made as to whether the darkest interferometric fringe 113' precisely overlaps the center of the core endface 25', based upon the gradient sums. It should be noted that several of the fringes 113 may pass through the core endface 25'. If not, then the precision autofocus algorithm 124 again moves the $n_3$ step, as set forth in block 178, and the foregoing analysis continues.

After the darkest interferometric fringe 113' has been precisely focused over what is believed to be the center of the core endface 25', an integrity check procedure is performed to ensure the integrity and accuracy of the focusing conclusion. This procedure is performed as indicated in flow chart blocks 182–184. The integrity check procedure ensures that a noise condition has not been inadvertently identified as the darkest fringe 113'. In essence, the integrity check procedure involves scanning another location of the image 111 at a predetermined distance from the supposed darkest fringe 113' where another fringe 113 should be present and determining whether the other fringe 113 exists at that location. Along these lines, based upon the fixed angle $\phi=3°$ and the wavelength $\lambda=600$ nm of interferometer white light, the fringes 113 should be spaced by approximately 300 nm.

As indicated in the flow chart block 182, the objective 96 is extended toward the target by a predetermined focus step having step size $n_4$. In the preferred embodiment, the predetermined focus step size $n_4$ is approximately 300 nm.

After movement of the objective 96 by the $n_4$ step, data base information regarding the last values of sums of gradients is retrieved, as is delineated in the flow chart block 183. Moreover, as indicated in the decisional flow chart block 184, an inquiry is made as to whether the optimal focal position (when darkest fringe 113' passes through core endface center) was passed based upon the location of the maximum gradient. If not, then the precision autofocus algorithm 124 moves the objective 96 by the $n_3$ step, as set forth in flow chart block 178, and once again performs the functionality set forth in previous flow chart blocks 178–184.

After it is determined that the optimal focal position has been passed, as indicated in the flow chart block 185, the excitation voltage value that was sent to the piezoelectric element 97 for generating the maximum gradient sum is retrieved, and the piezoelectric element 97 is controlled by this excitation voltage value to move the objective 96 back to the confirmed optimal focus position (i.e. where the darkest fringe 113' passes precisely through the core endface center).

Finally, as indicated in the flow chart block 186, the precision focus grid for finding the optimal focus position is purged, leaving behind the fringe pattern 112 centered over the fiber endface 26' with the darkest fringe 113' passing through the center of the core endface 25', as is delineated in the flow chart block 186. The precision focus algorithm 124 then transfers to the self-calibration algorithm 125 at the conclusion of the foregoing procedure.

E. Self-Calibration Algorithm

Figure 10A:
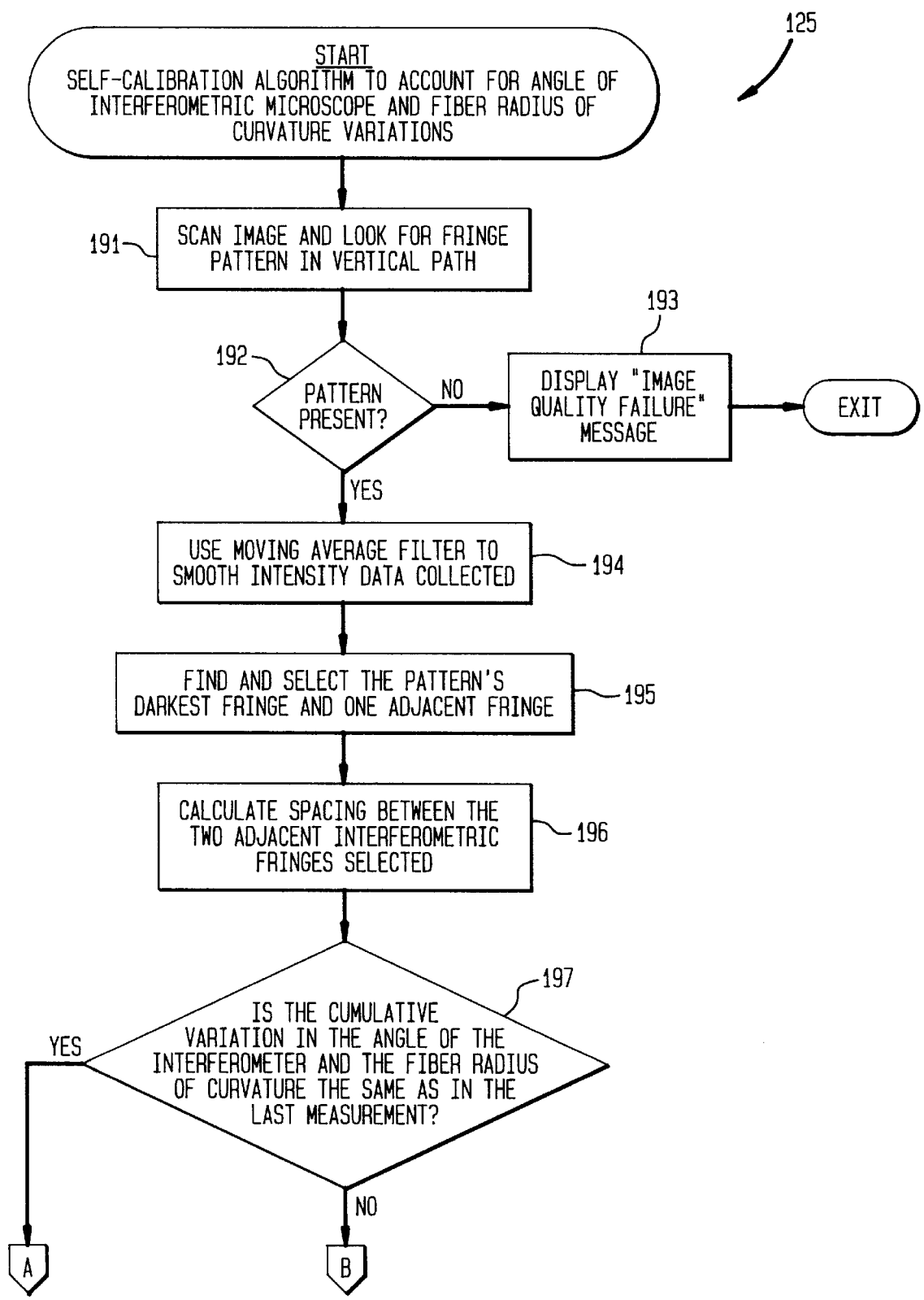
FIGS. 10A through 10B show a flow chart illustrating the architecture and functionality of a self-calibration algorithm associated with the inspection control algorithm of FIG. 5.
Figure 10B:
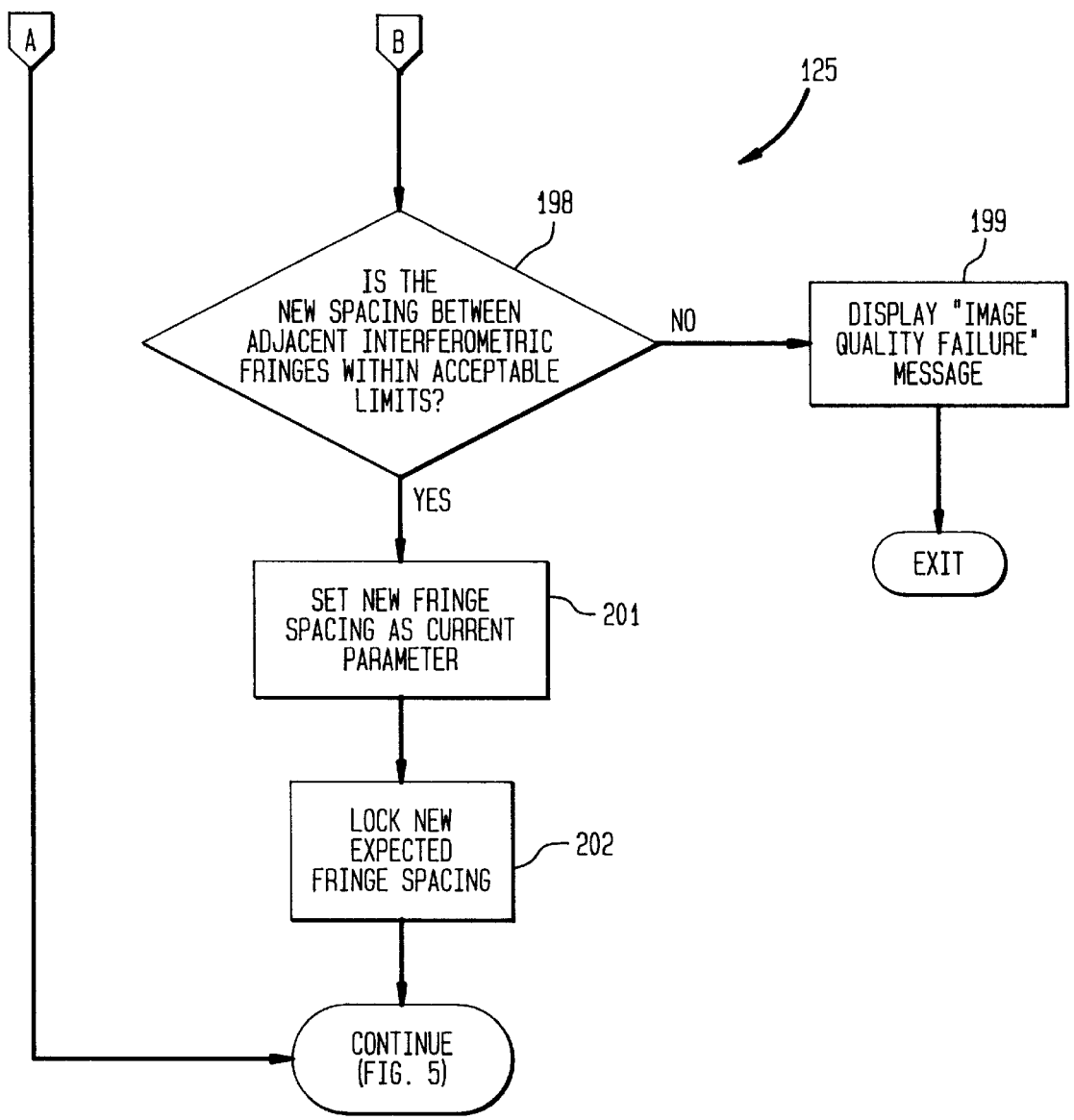

The self-calibration algorithm 125 is now described with reference to FIGS. 10A through 10B. In essence, the self-calibration algorithm 125 measures the fringe spacing in terms of pixels. The algorithm 125 accounts for changes in the angle $\phi$ of the combination of the interferometer 98 and objective 96 along axis $a_2$ relative to the longitudinal axis $a_1$ passing through the target 82. The self-calibration algorithm 125 further accounts for changes in the radius of curvature of the endface 79 (includes fiber endface 26' and plug endface 36'), which is expected to be, but not necessarily, about 10 to 25 millimeters (mm).

Initially, in the self-calibration algorithm 125, an image 111 is sampled, and the fringe pattern 112 is searched for along a vertical axis in the image 111. In the preferred embodiment, the vertical line is selected so that the vertical line does not pass through the transition zones 117a, 117b. The fringe pattern 112 can be searched by summing the absolute value of gradients within the vertical line. The gradient is the difference between a pixel value and the value of an adjacent pixel along a given direction.

As indicated in the flow chart block 192, a determination is made as to whether the fringe pattern 112 is present. If the pattern 112 is not present, then the gradient is small. However, if the pattern 112 is present, then the gradient is very large. If the pattern 112 is not present, then as indicated in the flow chart block 193, a message indicating image quality failure is driven to the display 39 (FIG. 3) by the machine vision system 92 and the algorithms 125, 120 end.

When it is determined that the fringe pattern 112 is present, then the intensity data along the vertical line is smoothed using a moving average filter so as to minimize potential adverse effects resulting from noise. Noise could be produced, for example, by dust, a bonding agent (e.g., epoxy), or some other foreign matter on the endface 79 (FIG. 2). The moving average filter essentially eliminates local disturbances by replacing a pixel value with an average pixel value produced by averaging neighboring pixel values.

Next, in accordance with flow chart block 195, the location of the darkest fringe 113' and one of its adjacent fringes 113" (FIG. 4A) is determined. The pixel along the vertical line having the lowest intensity value will be the location of the center of the darkest band 113'. Moreover, adjacent local minimum values indicate the location of adjacent fringes 113".

The actual spacing between the darkest fringe 113' and an adjacent fringe 113" is computed, pursuant to flow chart block 196. The spacing between fringes is computed by the following steps: (1) analyzing a plurality of linear profiles of pixel values, the linear profiles running transverse to the fringes 113 of the pattern 112; (2) determining a location of a darkest pixel associated with each of the profiles; (3) quantifying a pixel distance between darkest pixels in adjacent profiles; (4) selecting pixel distances that fall within predetermined limits; and (5) averaging the pixel distances to create the measured spacing in terms of pixels.

An integrity check procedure is next performed to ensure the adequacy of the angle φ of the interferometer 98 and the radii of curvature associated with the endfaces 26', 36' (FIG. 2). In other words, it is possible that the angle φ, which is preferably set to about 3°, could change, and also that the radii of curvature, which are typically 10–25 mm, could also change. Moreover, both the angle φ and the radii affect the fringe spacing, and if the changes are drastic enough, then the measured fringe spacing will not have enough resolution to accurately determine the disparity d. Accordingly, at flow chart block 197, the measured fringe spacing (as determined in flow chart block 196) is compared to the previous fringe spacing of the last measurement. If there is a match, then the algorithm 125 transfers immediately back to the inspection control algorithm 120 (FIG. 5), thereby indicating that the angle φ of the interferometer 98 and the radii of curvature associated with the endfaces 26', 36' (FIG. 2) are adequate and thereby providing a measured fringe spacing with sufficient resolution (number of pixels) for future computation of the disparity d.

If there is not a match, then as indicated in flow chart block 198, an inquiry is made as to whether the measured spacing falls within an allowable predefined spacing range, i.e., whether the cumulative variation in the angle φ of the interferometer 98 and the fiber radius of curvature falls within allowable limits. If the measured fringe spacing falls within the predefined spacing range, then the measured fringe spacing will be utilized by the system 90 in the ultimate determination of the disparity d, as indicated in blocks 201, 202, and the algorithm 125 returns to the inspection control algorithm 120 (FIG. 5). If the measured fringe spacing falls within the predefined spacing range, then the measured fringe spacing is discarded and the algorithms 120, 125 terminate with a calibration error signal indicating image quality failure, as delineated in flow chart block 199.

F. Data Analysis Algorithm

Figure 11A:
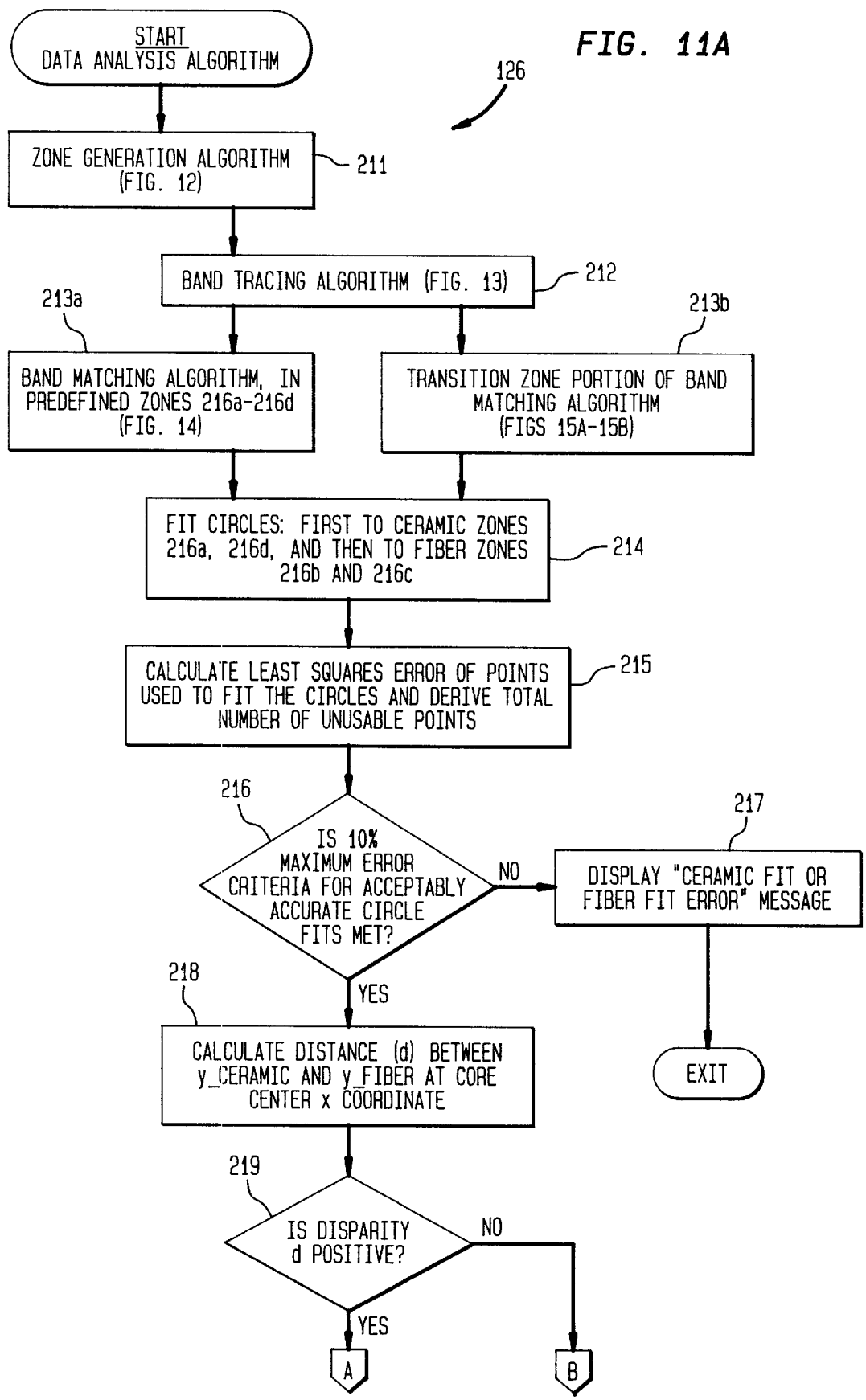

The data analysis algorithm 126 is now described with reference to FIGS. 11A through 11B. Generally, the data analysis algorithm 126 determines the disparity d (FIG. 2) corresponding with the degree of undercut/protrusion.

Figure 12:
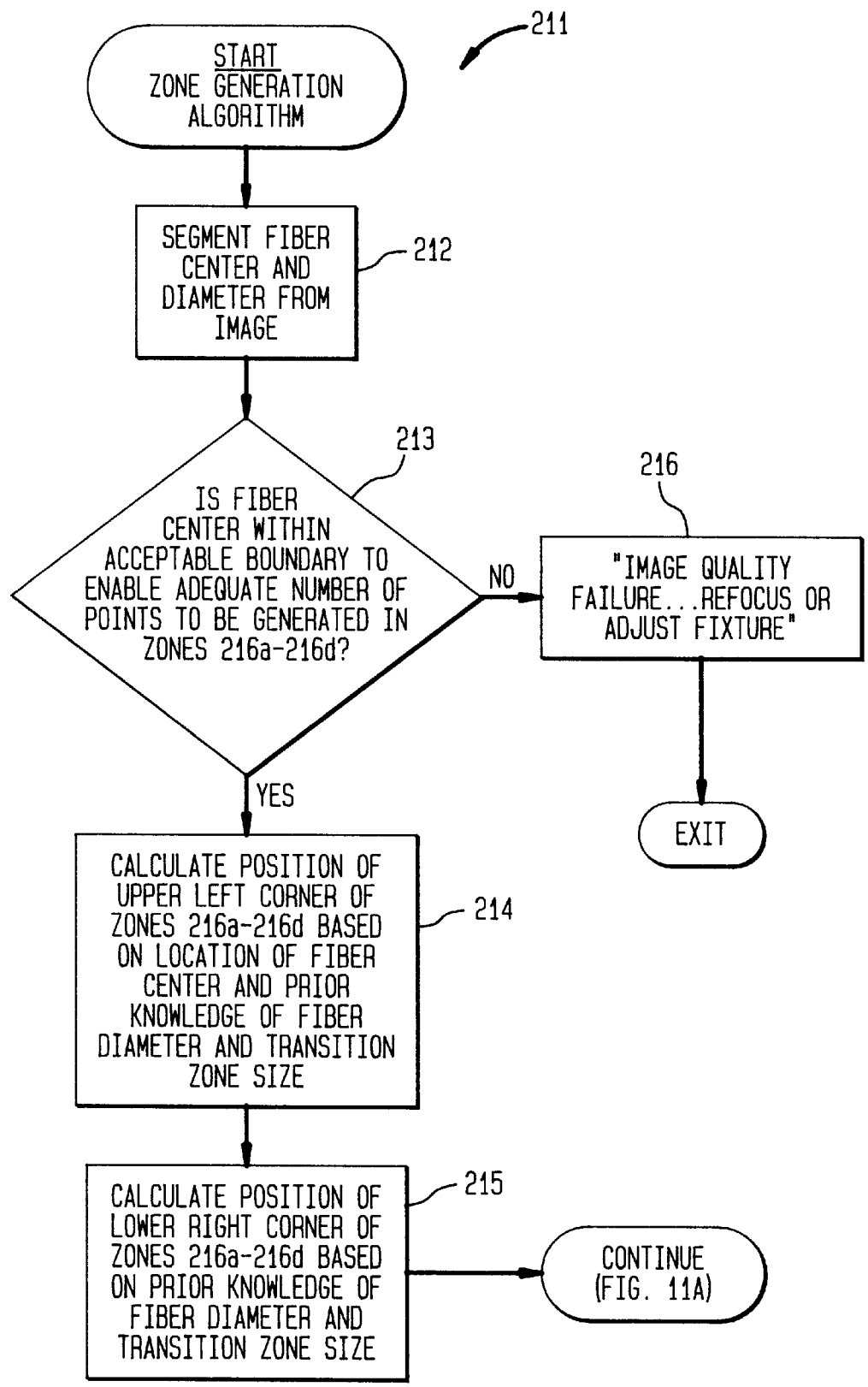
FIG. 12 is a flow chart illustrating the architecture and functionality of a zone generation algorithm associated with the data analysis algorithm of FIG. 11A.

Initially, pursuant to the flow chart block 211, the plurality of zones 116a–116d is generated via a zone generation algorithm that is described in detail hereafter with reference to FIG. 12. Although other numbers of zones 116 as well as zone shapes could be employed, a preferred embodiment employs four rectangular zones arranged as shown in FIG. 4A, with zones 116a, 116b being larger in area than zones 116b, 116c. Significantly, the implementation of the zones 116a–116b minimizes the number of requisite computations and significantly enhances the speed of the data analysis algorithm 126.

After the zones 116a–116d (FIG. 4A) have been produced, a band tracing algorithm is employed, in accordance with the flow chart block 212, in order to insure that the darkest fringe 113' is not a combination of overlapping fringes 113. Specifically, it is possible that the displacement of the fringe 113' in one of the transition zones between the plug endface 36' and the fiber endface 26' is so substantial that the fringe 113' on the fiber endface 26' aligns with an adjacent fringe 113" on the plug endface 36'. The band tracing algorithm 212 desirably detects this adverse predicament with definitive accuracy. The algorithm 212 will be described hereafter with reference to FIG. 13.

In accordance with the flow chart blocks 213a, 213b, a band matching algorithm and a transition zone algorithm are next concurrently employed to fill in discontinuities in the darkest fringe 113', which is used to compute the disparity d (undercut\protrusion), so that subsequent curve fitting and the disparity computation are optimized. The band matching algorithm indicated in flow chart block 213a is performed only on the data within zones 116a–116d, and the transition zone algorithm of flow chart block 213b processes the data only within transition zones 117a, 117b. The band matching algorithm of flow chart block 213a and the transition zone algorithm of flow chart block 213b will be described in detail hereinafter with reference to FIG. 14 and FIGS. 15A–15B, respectively.

Next, as delineated in flow chart block 214, a circle fitting process is employed to fit a first circle to the darkest fringe 113' in zones 116a, 116d and a second circle to the darkest fringe 113' in zones 116b, 116c. The first circle corresponds to the level of the plug endface 36' and the second circle corresponds to the level of the fiber endface 26'. In the preferred embodiment, the first and second circles are determined based upon the Hough Transform, as described in U.S. Pat. No. 5,179,419 to Palmquist et al., but many other suitable algorithms could be employed.

Pursuant to the flow chart block 215, a least squares error process is used to derive a total number of unusable points relative to the circle fitting process. Moreover, as indicated in the flow chart block 216, an inquiry is made as to whether the total number of unusable points is beyond a predetermined threshold $T_1$. If the number of unusable points is too high, i.e., is above $T_1$, then the data analysis algorithm 126 causes a message to be driven to the display 93, indicating a ceramic fit or fiber fit error and the inspection control algorithm 120 (FIG. 5) terminates.

When the number of unusable pixel values falls under the predetermined threshold $T_1$, then the circle fitting is deemed to be adequately accurate, and the data analysis algorithm 126 computes the disparity d. The disparity d is determined by calculating the difference between the y coordinate of the first circle that was fit to/between zones 116a, 116d and the second circle that was fit to/between zones 116b, 116c at the center x coordinate, in accordance with the flow chart block 218.

As delineated in the flow chart block 219, a determination is made as to whether the disparity d is a positive number. If the disparity d is positive, then the disparity d is interpreted as a protrusion of the fiber endface 26' over the surrounding plug endface 36' as indicated in the flow chart block 221a, and if the disparity d is not a positive number, then the disparity d is a negative number and the disparity d is interpreted as an undercut of the fiber endface 26' with respect to the surrounding plug endface 36', as indicated in the flow chart block 221b.

When a protrusion is concluded, the disparity d is compared to a predetermined pass/fail protrusion value to conclude whether the optical fiber termination 37 is adequate, as is further indicated in the flow chart block 221a. Furthermore, when an undercut is concluded, the disparity d is compared to a predetermined pass/fail undercut value to determine the adequacy of the attendant optical fiber termination 37, as is delineated in the flow chart block 221b.

Finally, in accordance with flow chart block 222, the radius of curvature of the plug endface 36' is computed based upon the first circle that was fit to/between the data in zones 116a, 116d. The radius of curvature is checked to verify that it is within acceptable limits. In the preferred embodiment, the expected radius is about 10 to 25 mm.

At this point, the measurement of the disparity d corresponding with the undercut/protrusion of the fiber endface 26' with respect to the surrounding plug endface 36' is now complete and the data analysis algorithm 126 transfers to a routine for display of the results and/or storage in memory, as is indicated in the flow chart block 127 (FIG. 5).

1. Zone Generation Algorithm

The architecture and functionality of the zone generation algorithm 211 is illustrated in detail in FIG. 12. The zone generation algorithm 211 produces the zones 116a–116d (FIG. 4A) in the image 111.

Initially, the coordinates of the fiber center and the diameter of the fiber endface 26' are segmented from the image 111, as is indicated in the flow chart block 212.

Next, as indicated in the flow chart block 213, a determination is made as to whether the fiber center is within an acceptable boundary to enable an adequate number of points to be generated in zones 116a–116d. If not, then the zone generation algorithm 211 drives a message to the display 93 (FIG. 3) indicating image quality failure and/or a recommendation to refocus or adjust the mechanical fixture supporting the optical fiber termination 37 (and fiber 26).

After it is determined that there is an acceptable spatial boundary around the fiber center, the zone generation algorithm 211 calculates the position of the upper left corner of zones 116a–116d based on the location of the fiber center and prior knowledge of the fiber diameter and transition zone size, pursuant to the flow chart block 214.

In accordance with the flow chart block 215, the position of the lower right corner of the zones 116a–116d (FIG. 4A) is computed based on prior knowledge of the fiber diameter and the transition zone size. Based upon the left and right corners of the zones 116a–116d, as is computed by the zone generation algorithm 211 as set forth in blocks 214, 215, the zones 116a–116d are fully defined. The zone generation algorithm 211 then transfers to the band tracing algorithm 212 (FIG. 11A).

2. Band Tracing Algorithm

Figure 13:
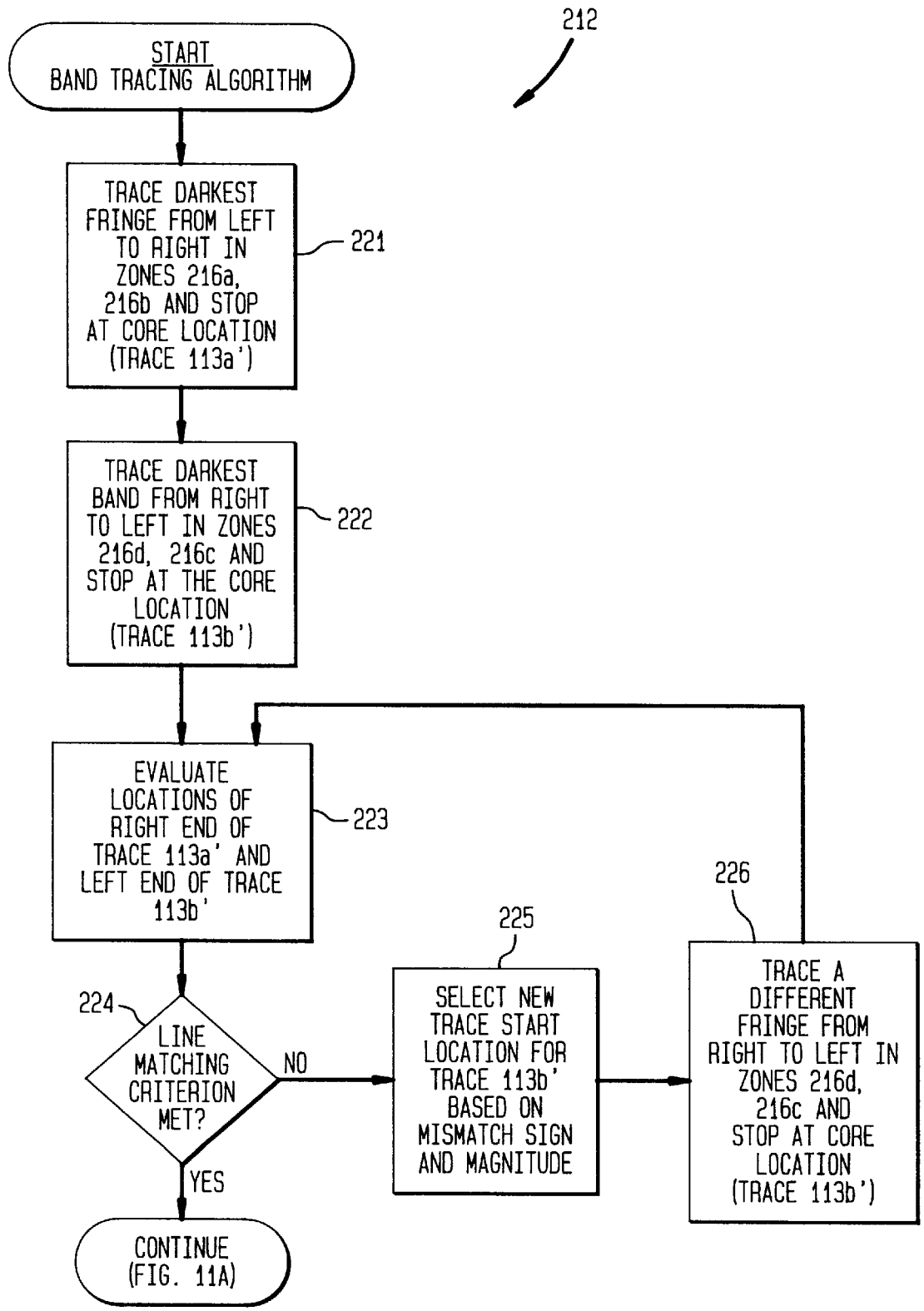
FIG. 13 is a flow chart illustrating the architecture and functionality of a band tracing algorithm associated with the data analysis algorithm of FIG. 11A.

The band tracing algorithm 212 is now described with reference to FIG. 13. The band tracing algorithm 212 ensures the integrity of the disparity determination by ensuring that the darkest fringe 113' does not overlap onto another fringe 113, perhaps its adjacent fringe 113", at the transition zones 117a, 117b (FIG. 4A).

The band tracing algorithm 212 traces the darkest fringe 113' from left to right in the image 111 through zones 116a–116b and stops at a pixel location 118a (FIG. 4A) at the beginning of the left side of the core endface 25', in accordance with the flow chart block 221.

Pursuant to flow chart block 222, the algorithm 212 traces the darkest band 113' from right to left in the image 111 through zones 116d, 116c and stops at a pixel location 118b (FIG. 4A) at the beginning of the right side of the core endface 25'.

The fiber endface intercept of traces 113a',113b' at respective pixel locations 118a, 118b is computed, as indicated in the flow chart block 223.

A determination is made as to whether the intercepts corresponding with traces 113a', 113b' match based upon a predetermined line matching criterion, as set forth in the flow chart block 224. In the preferred embodiment, the line matching criterion is a difference in the y coordinate of less than or equal to ½ of the calculated fringe spacing at pixels 118a, 118b. If the answer to the inquiry is in the affirmative, then the band tracing algorithm 212 is concluded and the data analysis algorithm 126 continues as indicated in FIG. 11A.

If the answer to the inquiry is in the negative, then the band tracing algorithm 212 selects a new trace start location for trace 113b' based on the mismatch sign and magnitude, as delineated in the flow chart block 225. In this case, the algorithm 212 traces a different fringe 113 from right to left in zones 116d and 116c and stops at the core endface 25', as indicated in the flow chart block 226. Moreover, the algorithm 212 performs the steps indicated in block 223, 224 of FIG. 13. The foregoing process continues until the line matching criterion is met.

3. Band Matching Algorithm

Figure 14:
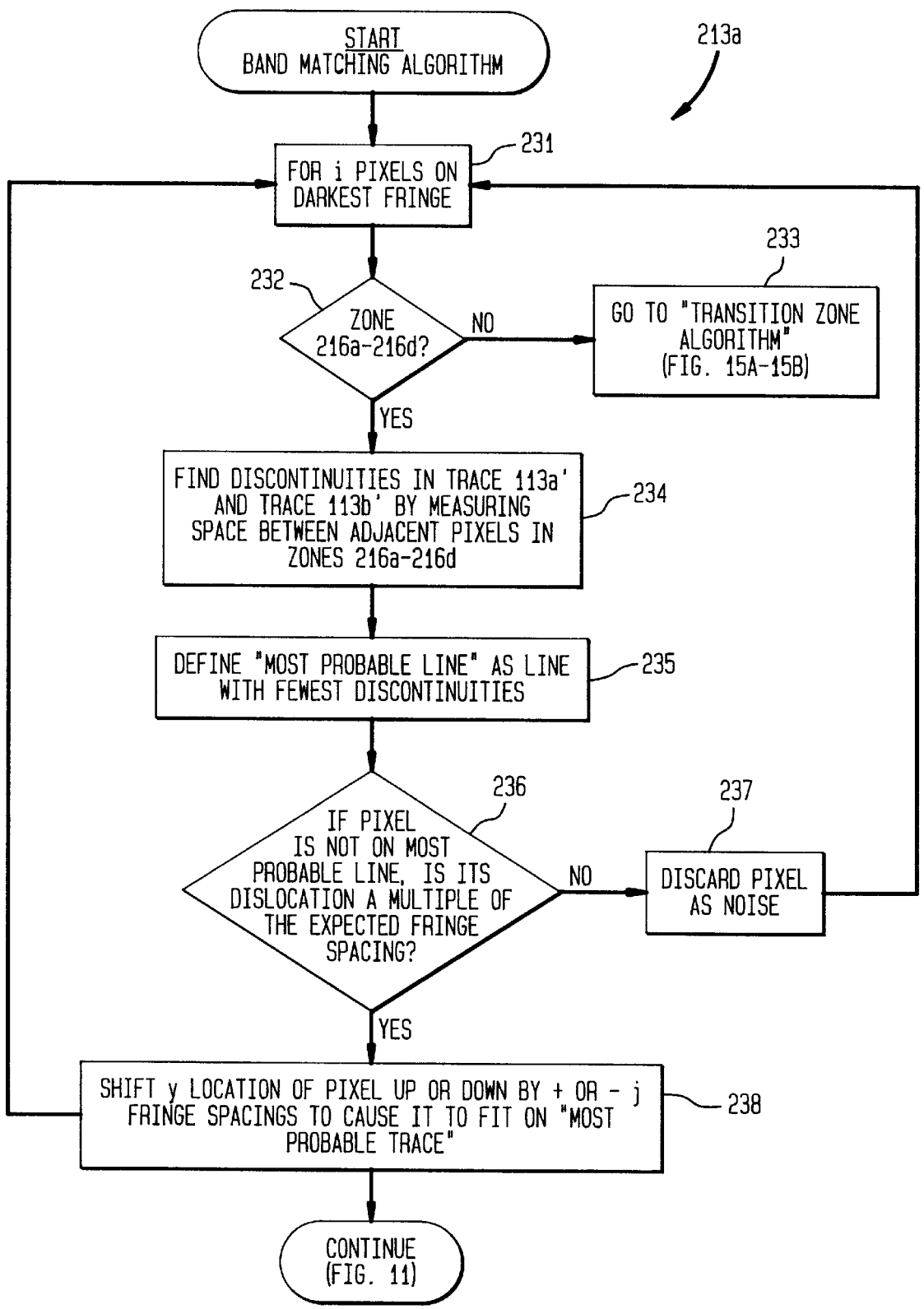
FIG. 14 is a flow chart illustrating the architecture and functionality of a band matching algorithm associated with the data analysis algorithm of FIG. 11A.

The functionality and architecture of the band matching algorithm 213a is set forth in FIG. 14. As mentioned, the band matching algorithm 213a fills in discontinuities in the darkest fringe 113' within zones 116a–116d(FIG. 4A) to optimize accuracy of curve fitting.

Initially, the darkest fringe 113' is analyzed on a pixel-by-pixel basis, from left to right in the preferred embodiment. This operation is shown in FIG. 14 by the loop commencing at flow chart block 231, where it is indicated that i pixels along the fringe 113' are considered.

After sampling a pixel value, the band matching algorithm 213a makes an inquiry as to whether the pixel is currently within the zones 116a–116d or within the transition zones 117a, 117b (FIG. 4A), as indicated in flow chart block 232. In the event that the pixel is in the transition zones 117a, 117b, then the algorithm 213a transfers to the transition zone algorithm 213b of FIGS. 15a–15b, as indicated in flow chart block 233, for processing the pixel value and successive pixel values along the darkest fringe 113'. Otherwise, the band matching algorithm 213a determines that the instant pixel value resides in one of the zones 116a–116d.

In this case, the algorithm 213a attempts to find any discontinuities in traces 113a', 113b', in accordance with flow chart block 234. To this end, the algorithm 213a measures the space between adjacent pixels in zones 116a–116d along both traces 113a',113b'.

Next, as indicated in the flow chart block 235, a most probable line is defined and computed based upon a line having the fewest discontinuities.

A determination is made as to whether the instant pixel on the most probable line is dislocated by a multiple of the expected fringe spacing (i.e., ~300 nm in the preferred embodiment), in accordance with flow chart block 236. If the pixel on the most probable line is not at a position which would be a multiple of the expected fringe spacing, then the pixel value is discarded as noise, as delineated in the flow chart block 237, and the algorithm 213a retrieves another pixel value, if any remain to be processed. However, if the pixel value is positioned at a multiple of the expected fringe spacing, then the vertical location of the pixel value is shifted up or down by j fringe spacings to cause it to fit on the most probable line, pursuant to the flow chart block 238. Said another way, the grey scale value of a pixel at a given location is assigned to another pixel location that is ±j fringes away, where j is the calculated mismatch multiple.

Afterward, the algorithm 213a retrieves another pixel value, if any remain to be processed. After all i pixel values have been processed, the band matching algorithm 213a returns to the data analysis algorithm 126 of FIGS. 11a and 11B.

4. Transition Zone Algorithm

Figure 15A:
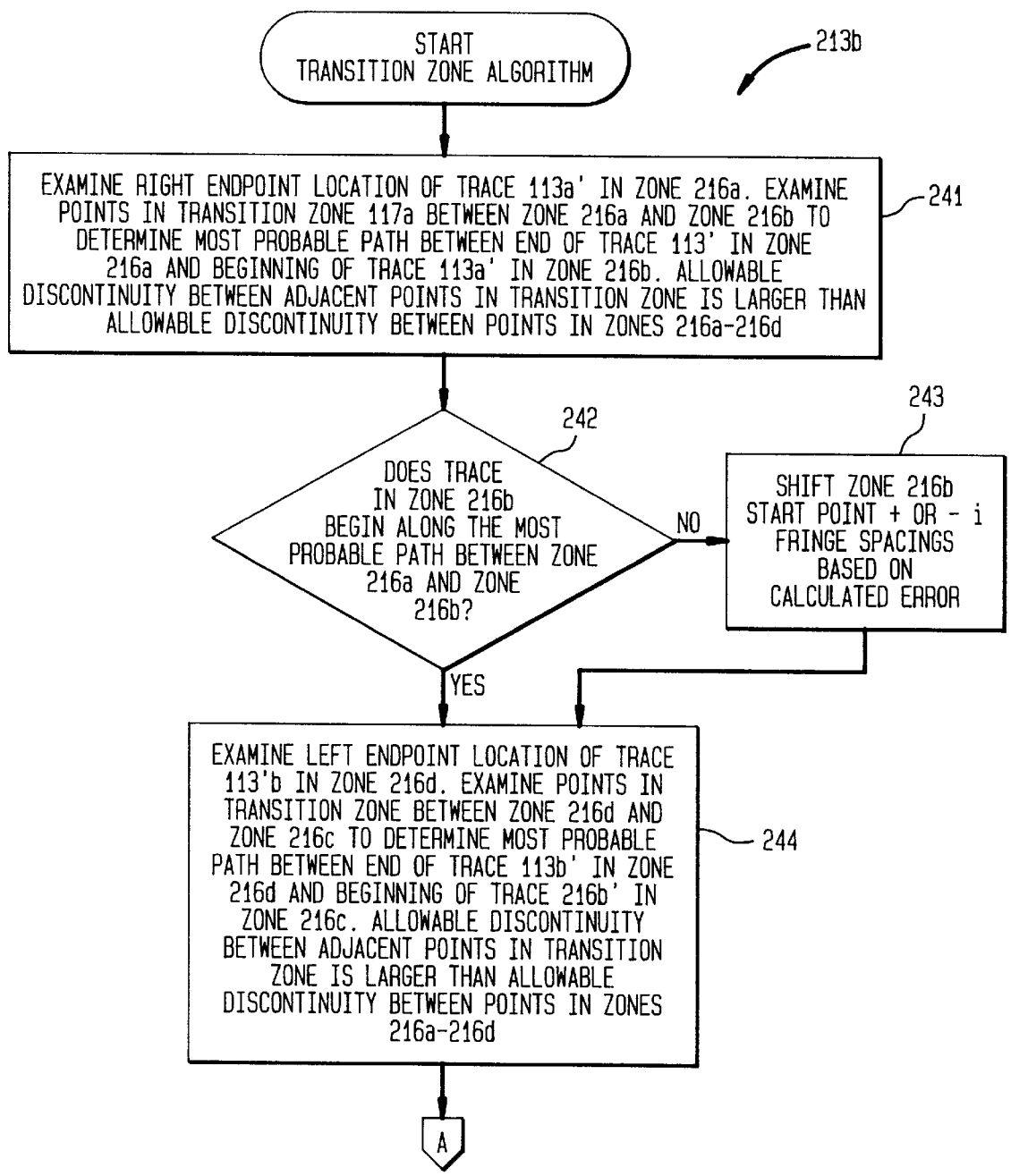
FIGS. 15A through 15B show a flow chart illustrating a transition zone algorithm associated with the data analysis algorithm of FIG. 11A.
Figure 15B:
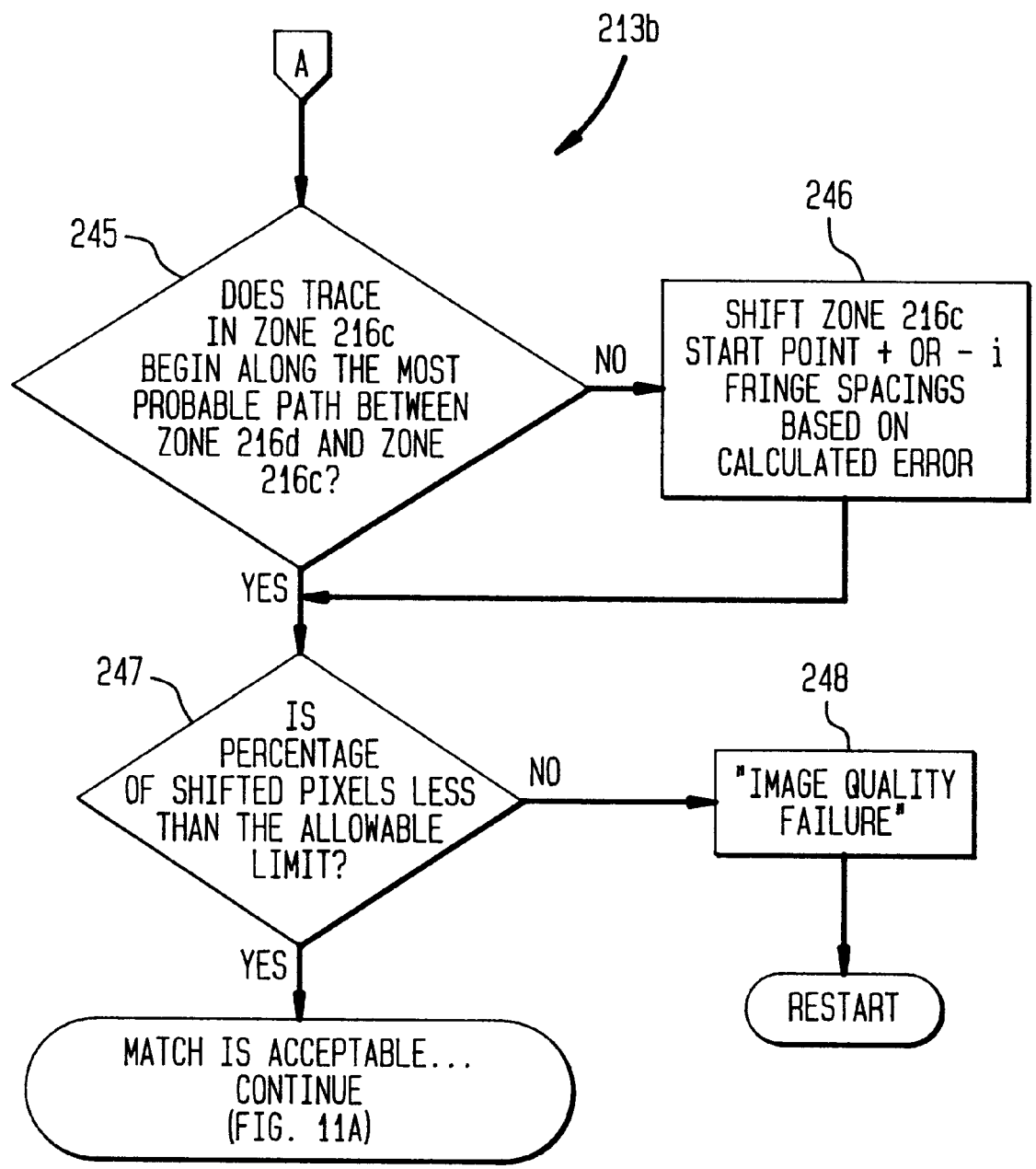

The transition zone algorithm 213b is illustrated by way of flow chart at FIGS. 15A through 15B. In general, the transition zone algorithm 213b accommodates for discontinuities in traces 113a', 113b' within the transition zones 117a, 117b, which can comprise more noise than the zones 116a–116b.

First, the right side pixel position 119a (FIG. 4A) of trace 113a' in zone 116a is identified. Moreover, the points in the transition zone 117a between zone 116a and zone 116b are examined to determine the most probable path through the transition zone 117a. In determining the most probable path, the allowable discontinuity between adjacent points in the transition zone 117a is larger than the allowable discontinuity between points within zones 116a–116d (see block 234 in FIG. 14).

Pursuant to the flow chart block 242, a determination is made as to whether the trace 113a' in zone 116b' begins along the most probable path between zones 116a, 116b. If not, then the start point of the trace 113a' in zone 116b is shifted by i fringe spacings based on the calculated error, as is set forth in the flow chart block 243.

After the shift as denoted in flow chart block 243 or when the trace 113a' in zone 116b does begin along the most probable path, then the transition zone algorithm 213b concludes analysis of transition zone 117a and begins analysis of transition zone 117b. In this regard, the algorithm 213b identifies the left side pixel position 119b (FIG. 4A) of trace 113b' in zone 116d. Further, the algorithm 213b examines the pixel locations in the transition zone 117b to determine the most probable path between the left side pixel position 119b and the beginning of trace 113b' in zone 116c. In determining the most probable path, the allowable discontinuity between adjacent points in the transition zone 117b is larger than the allowable discontinuity between points in zones 116a–116d.

Next, in accordance with the flow chart block 245, the algorithm 213b makes an inquiry as to whether the trace 113b' in zone 116c begins along the most probable path between zones 116d and zone 116c, i.e., through the transition zone 117b. If not, then the start point of the trace 113b' in zone 116c is shifted by i fringe spacings based on the calculated error, as is denoted in the flow chart block 246.

After the shift as indicated in the flow chart block 246 or if it is determined as indicated at flow chart block 245 that the trace 113b' does begin along the most probable path, then the algorithm 213b makes a determination as to whether the percentage of shifted pixels is less than a predetermined allowable limit, pursuant to the flow chart block 247. In this analysis, the algorithm 213b considers both the pixels shifted in the flow chart blocks 243 and 246. If the answer to the inquiry is in the negative, then the algorithm 213b causes a message to be driven to the display 93 (FIG. 3) indicating image quality failure, as delineated in the flow chart block 248. If, however, the answer to the inquiry is in the affirmative, the conclusion is that the match is acceptable, and the transition zone algorithm 213b transfers back to the data analysis algorithm 126 of FIG. 11A.

In conclusion, it will be obvious to those skilled in the art that many modifications and variations may be made to the preferred embodiment as described without substantially departing from the spirit and scope of the present invention. It is intended that all such modifications and variations be included herein within the scope of the present invention, as is set forth in the appended claims.

Wherefore, the following is claimed:

1. An inspection for an automatic inspection system for contactlessly measuring disparity between two surfaces, comprising the steps of:

producing automatically with said inspection system an image of a first surface and a second surface with an interferometric fringe superimposed over first and second image regions representing said first and second surfaces, respectively; and determining automatically with said inspection system said disparity between said first and second surfaces based upon an offset of said fringe between said first and second image regions.

2. The method of claim 1, wherein said disparity corresponds to a displacement between a curvature of an optical fiber and a curvature associated with a surrounding material.

3. The method of claim 1, wherein said first and second surfaces correspond respectively to spherical endfaces of an outer support material and an inner optical fiber, and wherein said disparity corresponds to a difference between said spherical fiber endface and said spherical support material endface as measured along a line approximately normal to said fiber endface at a point that intersects a center of a fiber core of said fiber.

4. The method of claim 1, wherein said interferometric fringe is a highest gradient fringe of an interferometric pattern produced with white light.

5. The method of claim 1, further comprising the steps of:
exposing said surfaces to a camera;
generating a signal of said surfaces with said camera; and
producing a digital image from said signal with a machine vision system.

6. The method of claim 1, further comprising the step of capturing said image with an interferometer having an objective disposed at an angle relative to an axis that is substantially perpendicular to said surfaces.

7. The method of claim 1, further comprising the steps of:
(1) exposing said surfaces to an interferometer having an objective disposed at an angle relative to an axis that is substantially perpendicular to said surfaces; and
(2) capturing said image with a camera coupled to said interferometer.

8. The method of claim 1, wherein said surfaces are substantially spherical and further comprising the steps of:
(1) fitting first and second circles to first and second image regions respectively; and
(2) deriving said offset by subtracting locations of said first and second circles at a predefined location in said image.

9. The method of claim 7, further comprising the step of moving said interferometric fringe at a desired location in said image by adjusting a displacement of said interferometer relative to said surfaces.

10. The method of claim 7, wherein said angle is approximately between 2 and 9 degrees.

11. An automatic inspection system for contactlessly measuring disparity between two surfaces, comprising:
means for producing an image of a first surface and a second surface with an interferometric fringe superimposed over first and second image regions representing said first and second surfaces, respectively; and
means for automatically determining said disparity between said first and second surfaces based upon an offset of said fringe between said first and second image regions.

12. An automatic inspection system for contactlessly measuring disparity between two surfaces, comprising:

an interferometer having an objective disposed at an angle relative to an axis that is substantially perpendicular to a target from which said surfaces are measured so that when said surfaces are exposed to said objective an interferometric fringe is superimposed over an image captured by said interferometer;

a camera coupled to said interferometer for encoding said image; and a machine vision system connected to said camera for receiving said image, said machine vision system configured to automatically determine said disparity between said surfaces based upon an offset between said fringe in a first image region representing said first surface and said fringe in a second image region representing said second surface.

13. The system of claim 12, further comprising an output device controlled by said machine vision system for conveying information regarding said image to a user.

14. The system of claim 12, wherein said disparity corresponds to undercut of an optical fiber relative to a curvature associated with a surrounding material.

15. The system of claim 12, wherein said disparity corresponds to protrusion of an optical fiber relative to a curvature associated with a surrounding material.

16. The system of claim 12, wherein said interferometric fringe is a highest gradient fringe of an interferometric pattern produced with white light.

17. The system of claim 12, wherein said surfaces are substantially spherical and wherein said machine vision system comprises:

(1) means for fitting first and second circles to said first and second image regions respectively; and (2) means for deriving said offset by subtracting locations of said first and second circles at a predefined location in said image.

18. The system of claim 12, further comprising a means for automatically moving said interferometric fringe at a desired location in said image by adjusting a displacement of said interferometer relative to said target.

19. The system of claim 12, wherein said angle is approximately between 2 and 9 degrees.

* * * * *

UNITED STATES PATENT AND TRADEMARK OFFICE
CERTIFICATE OF CORRECTION

PATENT NO. : 5,898,494
DATED : April 4, 1999
INVENTOR(S) : Csipkes

It is certified that error appears in the above-identified patent and that said Letters Patent is hereby corrected as shown below:

On the title page, Item [75]
Add the following inventor:
John M. Palmquist

Signed and Sealed this

Second Day of May, 2000

Attest:

Q. TODD DICKINSON

Attesting Officer     Director of Patents and Trademarks